(12) United States Patent
Heater

(10) Patent No.: US 10,901,586 B2
(45) Date of Patent: *Jan. 26, 2021

(54) AUGMENTED PHYSICAL AND VIRTUAL MANIPULATIVES

(71) Applicant: Pearson Education, Inc., New York, NY (US)

(72) Inventor: Richard Heater, Wheeling, IL (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,100

(22) Filed: Sep. 19, 2018

(65) Prior Publication Data

US 2019/0018578 A1  Jan. 17, 2019

Related U.S. Application Data

(63) Continuation of application No. 15/178,047, filed on Jun. 9, 2016.

(Continued)

(51) Int. Cl.
*G06F 3/0484* (2013.01)
*G06F 3/0354* (2013.01)
(Continued)

(52) U.S. Cl.
CPC .......... *G06F 3/04845* (2013.01); *A63F 13/00* (2013.01); *A63F 13/213* (2014.09);
(Continued)

(58) Field of Classification Search
CPC ...... A63F 13/00; A63F 13/213; A63F 13/428; A63F 13/65; G06F 3/011; G06F 3/0304;
(Continued)

(56) References Cited

U.S. PATENT DOCUMENTS 7,843,429 B2 * 11/2010 Pryor ...................... G06F 3/042
                                                    345/158
10,146,414 B2 * 12/2018 Heater ................ G06F 3/04845
(Continued)

*Primary Examiner* — Hong Zhou
(74) *Attorney, Agent, or Firm* — Quarles and Brady LLP

(57) ABSTRACT

Techniques are disclosed for detecting, tracking, and recording data associated with physical manipulatives in a physical environment, and a corresponding set of virtual manipulatives in a virtual environment. Physical manipulative sensor devices may be configured to detect the position and/or movements of physical manipulatives within a physical environment, including simple or multi-step user interactions with physical manipulatives. The sensor devices and/or associated user computing devices may use the sensor data to determine updated positions, orientations, and configurations for one or more physical manipulatives within the physical environment, as well as defining relationships between sets of the physical manipulatives. Data identifying updated positions, orientations, configurations, and relationship of the physical manipulatives may be transmitted to associated user devices, and a corresponding virtual environment having virtual manipulatives may be output and updated via a graphical display screen to reflect the changes to the physical manipulatives within the physical environment.

8 Claims, 14 Drawing Sheets

Related U.S. Application Data

(60) Provisional application No. 62/173,153, filed on Jun. 9, 2015.

(51) Int. Cl.

| | | |
|---|---|---|
| *H04L 29/08* | (2006.01) | |
| *G07F 17/32* | (2006.01) | |
| *G06T 19/00* | (2011.01) | |
| *G06F 3/042* | (2006.01) | |
| *G06F 3/03* | (2006.01) | |
| *G06F 3/01* | (2006.01) | |
| *A63F 13/428* | (2014.01) | |
| *A63F 13/65* | (2014.01) | |
| *A63F 13/00* | (2014.01) | |
| *H04N 5/77* | (2006.01) | |
| *G06T 19/20* | (2011.01) | |
| *A63F 13/213* | (2014.01) | |

(52) U.S. Cl.
CPC ............ *A63F 13/428* (2014.09); *A63F 13/65* (2014.09); *G06F 3/011* (2013.01); *G06F 3/0304* (2013.01); *G06F 3/0354* (2013.01); *G06F 3/0425* (2013.01); *G06T 19/006* (2013.01); *G06T 19/20* (2013.01); *G07F 17/32* (2013.01); *H04L 67/12* (2013.01); *H04N 5/77* (2013.01)

(58) Field of Classification Search
CPC .. G06F 3/0354; G06F 3/0425; G06F 3/04845; G06T 19/006; G06T 19/20; G07F 17/32; H04L 67/12; H04N 5/77
See application file for complete search history.

(56) References Cited

U.S. PATENT DOCUMENTS

| | | | |
|---|---|---|---|
| 2009/0158210 A1* | 6/2009 | Cheng | G06Q 10/10 715/810 |
| 2009/0197658 A1* | 8/2009 | Polchin | A63F 13/02 463/9 |
| 2011/0267259 A1* | 11/2011 | Tidemand | G06F 3/017 345/156 |
| 2012/0212509 A1* | 8/2012 | Benko | G03B 35/00 345/633 |
| 2013/0135081 A1* | 5/2013 | McCloskey | G07D 7/12 340/5.8 |
| 2014/0094304 A1* | 4/2014 | Harris | A63F 13/00 463/31 |

\* cited by examiner

AUGMENTED PHYSICAL AND VIRTUAL MANIPULATIVES

CROSS-REFERENCE TO RELATED APPLICATIONS

The present application is a continuation of and claims priority to U.S. patent application Ser. No. 15/178,047 entitled "AUGMENTED PHYSICAL AND VIRTUAL MANIPULATIVES" and filed on Jun. 9, 2016, which is a non-provisional of and claims priority to U.S. Provisional Patent Application No. 62/173,153, filed Jun. 9, 2015, entitled "AUGMENTED PHYSICAL AND VIRTUAL MANIPULATIVES," the entire contents of which are incorporated herein by reference for all purposes.

BACKGROUND

Many types of human-computer interaction are by nature notional, as computer users access and manipulate virtual representations of objects rather than the physical objects themselves. However, research shows that for human-computer interaction systems, such as electronic learning systems, gaming systems, and interactive media systems, the level of engagement and depth of understanding of users may depend on the strength of connections among the representations of objects. Access and manipulation of virtual objects (or "virtual manipulatives") via computer systems may be initially confusing and theoretical to users who cannot fully appreciate the connections between the virtual manipulatives and the physical world. Engagement and understanding are often greater for users when accessing and manipulating physical objects, and using such "physical manipulatives" may be critical in helping users establish the connections between notional concepts and physical objects.

For example, when engaged in designing or engineering tasks, playing sports or games, performing creative activities, or learning mathematical and scientific concepts, the use of physical manipulatives may provide a tactile experience that allows users to better understand the tasks, games, and concepts in the context of the physical world. Nonetheless, physical manipulatives have several disadvantages and limitations. For example, physical manipulatives often lack flexibility, control and constraint systems, and generally cannot provide feedback to users.

SUMMARY

Various techniques are described herein for detecting, tracking, and recording data associated with physical manipulatives in a physical environment, and a corresponding set of virtual manipulatives in a virtual environment. In certain embodiments, physical manipulative sensor devices may include various hardware-based sensors configured to detect a set of physical manipulatives within a physical environment. Such hardware-based sensors may include, for example, cameras, audio recording systems, infrared (IR) depth sensors, and radio-frequency identification (RFID) readers, among others. Such sensor devices may be configured to detect the position and/or movements of physical manipulatives within the physical environment, including simple or multi-step user interactions with physical manipulatives. The sensor devices and/or associated user computing devices may use the sensor data to determine updated positions, orientations, and configurations for one or more physical manipulatives within the physical environment, as well as defining relationships between sets of the physical manipulatives. In some embodiments, data identifying updated positions, orientations, configurations, and relationship of the physical manipulatives may be transmitted to associated user devices, and a corresponding virtual environment having virtual manipulatives may be output and updated via a graphical display screen to reflect the changes to the physical manipulatives within the physical environment.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
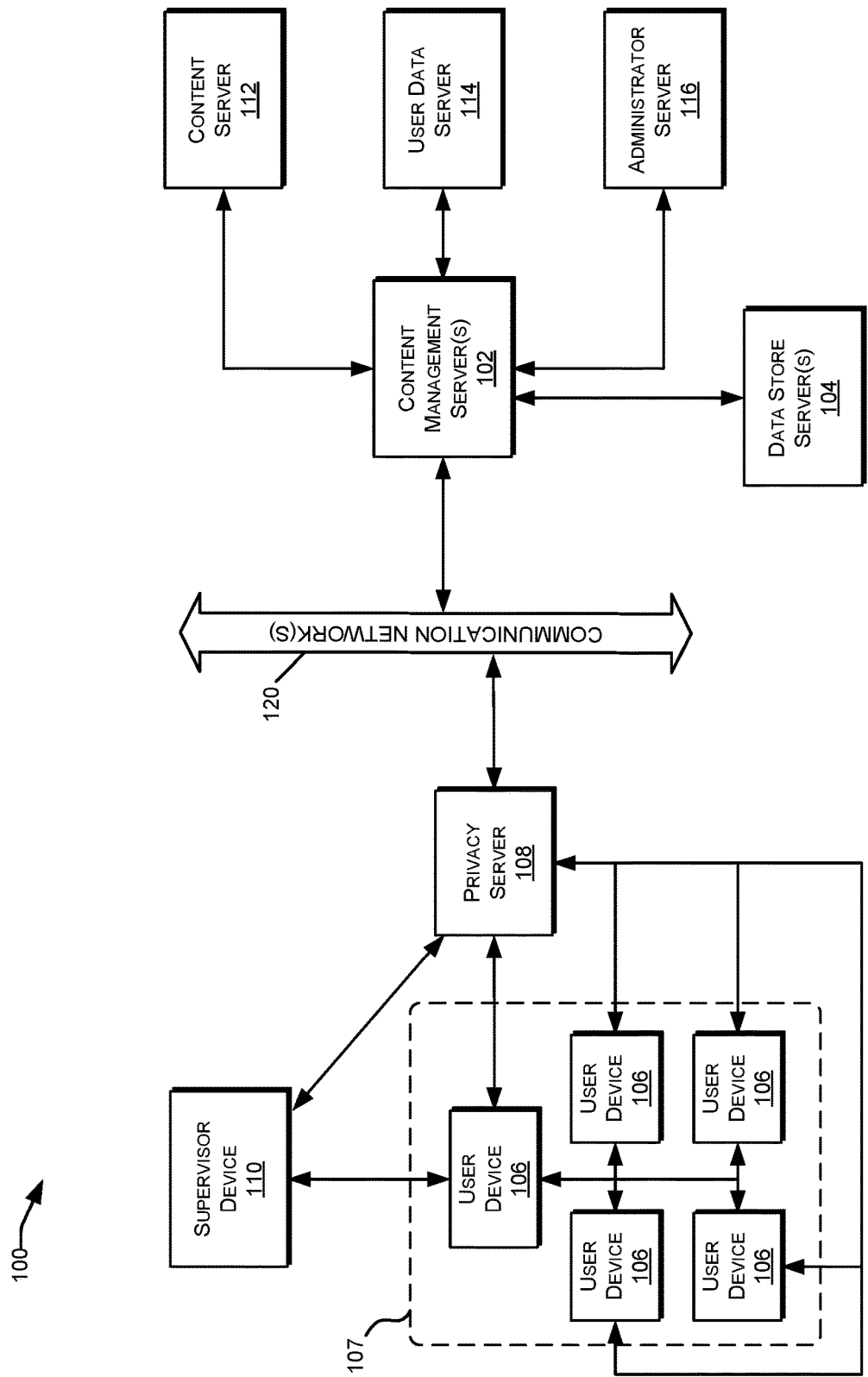
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, also referred to herein as "databases", such as database servers and/or file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content distribution network 100. Illustrative examples of databases 104 that may be maintained in certain embodiments of the content distribution network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, databases, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more survey servers 119. The survey server 119 may include hardware and software components to generate, store, and maintain the survey resources for distribution to user devices 106 and other devices in the network 100. In some embodiments, the survey server 119 can send survey information to one or several of the user devices 106 and/or receive survey information from one or several of the user devices 106.

In some embodiments, the survey server 119 can be configured to generate and/or aggregate one or several surveys based on questions received from a user device 106 and/or a supervisor device 110. In some embodiments, the survey server 119 can be configured to generate and/or aggregate one or several surveys based on questions stored in a database in the database server 104.

In some embodiments, the survey server 119 can be configured to receive, sort, and/or analyze some or all of the survey information received from the one or several user devices 106. In some embodiments, the survey server 119 can receive the survey information, classify the survey information, and direct the storage of the survey information within one or several of the databases of the database server 104 according to one or several attributes of the survey information. In some embodiments, these one or several attributes can, for example, relate to whether the survey information is of the type used for providing real-time feedback, or of the type that is not used for providing real-time feedback.

By way of example, in some embodiments, survey information can be received during, for example, a lecture, a class, or the like, and can be used to affect a portion of that lecture, class, or the like. In such an embodiment, the survey information can be analyzed to determine the effectiveness of the lecture, the class, or the like and feedback can be provided during the lecture, class, or the like based on the analysis of the survey data. As used herein, feedback is provided in real-time if feedback is provided before the completion of the lecture, class, or the like from which survey data was collected upon which the feedback is based.

In such an embodiment in which real-time feedback is desired, the speed with which the survey data is accessible and analyzable can determine whether timely, real-time feedback can be provided. Thus, in some embodiments, such survey information for which timely, real-time feedback may be desired can be directed for storage in a database located in a tier 0 or tier 1 memory, and survey information for which real-time feedback is not desired may be directed for storage in a database located in a lower tier memory.

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

In some embodiments, some of the components of the content distribution network 100 can be identified as being part of the back-end components 122. The back-end components 122 can include, for example, the content management server 102, the database server 1204, the privacy server 108, the content server 112, the user data server 114, the administrator server 116, and/or the communication network 120.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 124.

In some embodiments, navigation system 124 can include or several features that can communicate with one or several components of the content distribution network 100 including, for example, with one or several of the user devices 106 and/or with one or several of the supervisor devices 110. In some embodiments, this communication can include the transmission of a signal from the navigation system 124 which signal is received by one or several components of the content distribution network 100 and can be used to determine the location of the one or several components of the content distribution network 100.

Figure 2:
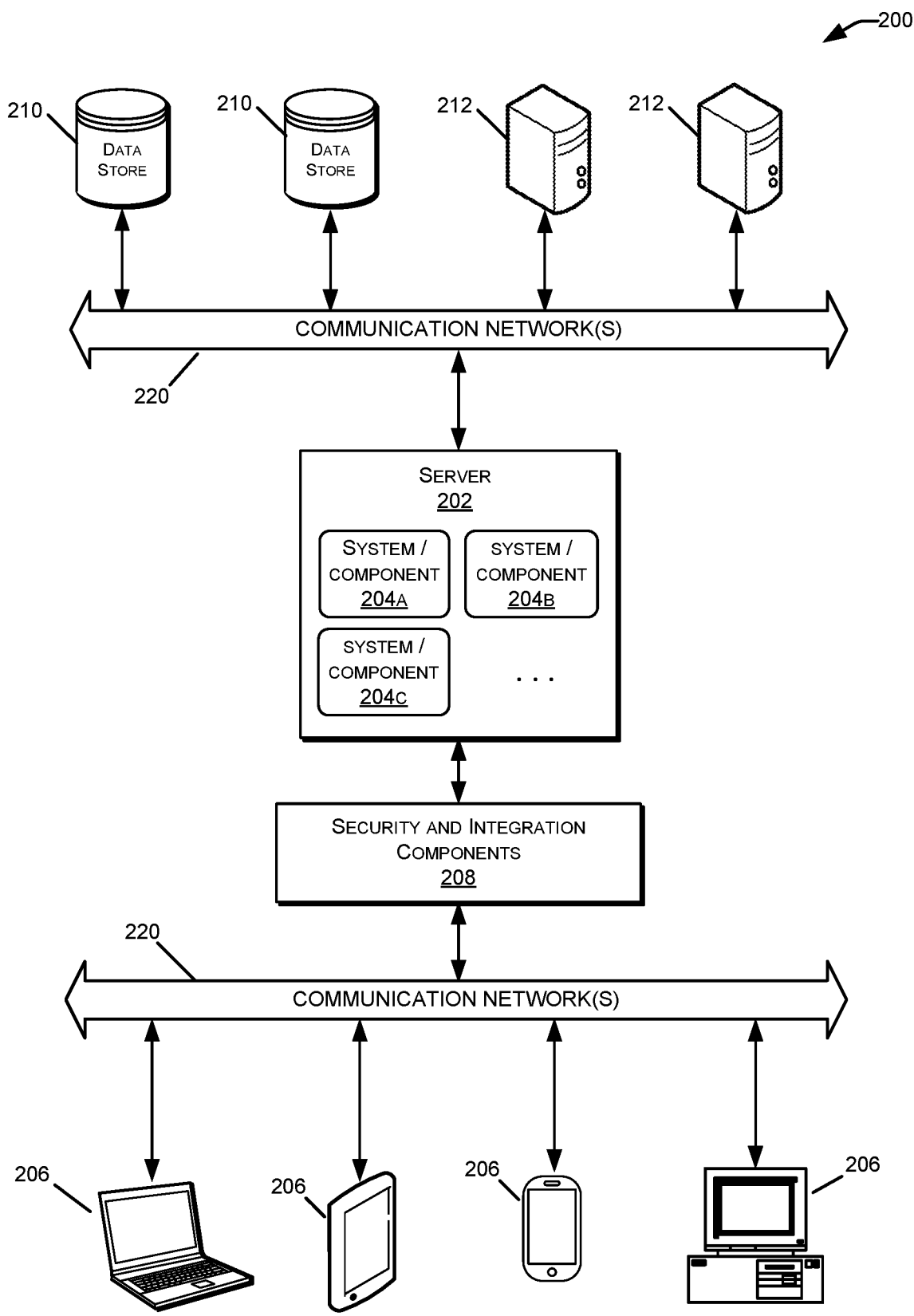
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN), or may use storage-as-a-service (STaaS) architectural model. In some embodiments, the computing environment can be replicated for each of the networks 107, 122, 104 discussed with respect to FIG. 1 above.

Figure 3:
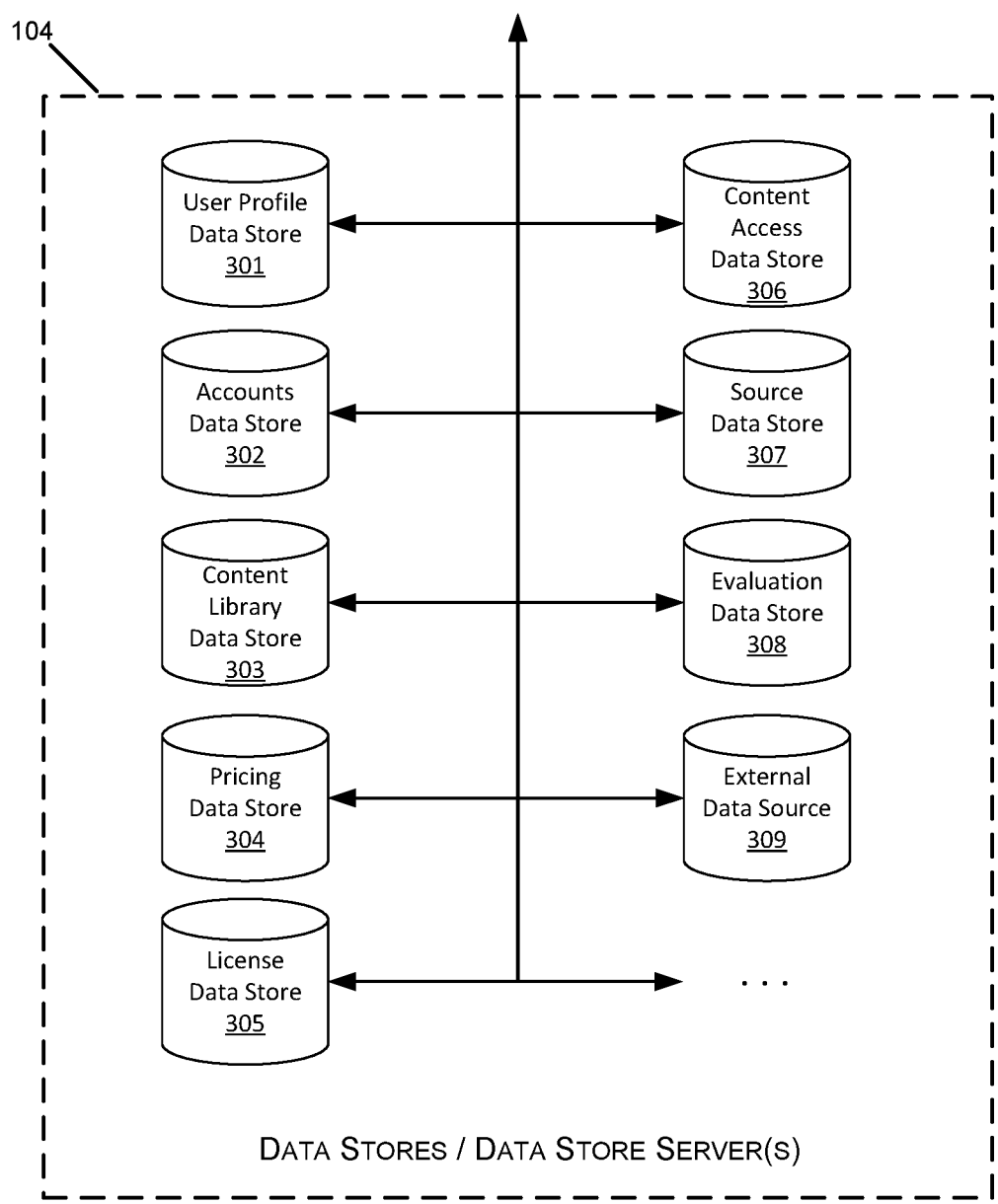
FIG. 3 is a block diagram illustrating an embodiment of one or more data store servers within a content distribution network.

With reference to FIG. 3, an illustrative set of databases and/or database servers is shown, corresponding to the databases servers 104 of the content distribution network 100 discussed above in FIG. 1. One or more individual databases 301-312 may reside in storage on a single computer server 104 (or a single server farm or cluster) under the control of a single entity, or may reside on separate servers operated by different entities and/or at remote locations. In some embodiments, databases 301-312 may be accessed by the content management server 102 and/or other devices and servers within the network 100 (e.g., user devices 106, supervisor devices 110, administrator servers 116, etc.). Access to one or more of the databases 301-312 may be limited or denied based on the processes, user credentials, and/or devices attempting to interact with the database.

The paragraphs below describe examples of specific databases that may be implemented within some embodiments of a content distribution network 100. It should be understood that the below descriptions of databases 301-312, including their functionality and types of data stored therein, are illustrative and non-limiting. Database server architecture, design, and the execution of specific databases 301-312 may depend on the context, size, and functional requirements of a content distribution network 100. For example, in content distribution systems 100 used for professional training and educational purposes, separate databases or file-based storage systems may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listing of available content titles and descriptions, content title usage statistics, subscriber profiles, account data, payment data, network usage statistics, etc.

A user profile data store 301, also referred to herein as a user profile database 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, content authors, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to a student's academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content distribution network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content distribution network 100.

In some embodiments, the user profile database 301 can include information relating to one or several student-user behaviours including, for example: attendance in one or several courses; attendance and/or participation in one or several study groups; extramural, student group, and/or club involve and/or participation, or the like. In some embodiments, this information relating to one or several student-user behaviors can include information relating to the student-users schedule.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content distribution network 100.

An accounts datastore 302, also referred to herein as an accounts database 302, may generate and store account data for different users in various roles within the content distribution network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library datastore 303, also referred to herein as a content library database 303, may include information describing the individual content items (or content resources or data packets) available via the content distribution network 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content distribution network 100. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, a p value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

A pricing database 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content distribution network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content distribution network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source datastore 307, also referred to herein as a source database 307, may include information relating to the source of the content resources available via the content distribution network. For example, a source database 307 may identify the authors and originating devices of content resources, previous pieces of data and/or groups of data originating from the same authors or originating devices, and the like.

An evaluation datastore 308, also referred to herein as an evaluation database 308, may include information used to direct the evaluation of users and content resources in the content management network 100. In some embodiments, the evaluation database 308 may contain, for example, the analysis criteria and the analysis guidelines for evaluating users (e.g., trainees/students, gaming users, media content consumers, etc.) and/or for evaluating the content resources in the network 100. The evaluation database 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation database 308 including data and/or instructions in the form of one or several electronic rubrics or scoring guides for use in the evaluation of the content, users, or applications. The evaluation database 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to: generate a prediction of the risk of a student-user not achieving one or several predetermined outcomes; generate a prediction of a categorization of the student-user, which categorization can indicate an expected effect of one or several interventions on the student-user; and/or generate a prediction of a priority for any identified intervention.

In some embodiments, the risk model can comprise one or several predictive models based on, for example, one or several computer learning techniques. In some embodiments, the risk model can be used to generate a risk value for a student, which risk value characterizes the risk of the student-user not achieving the predetermined outcome such as, for example, failing to complete a course or course of study, failing to graduate, failing to achieve a desired score or grade, or the like. In some embodiments, the risk model can comprise, for example, a decision tree learning model. In some embodiments, the risk model can generate the risk value through the inputting of one or several parameters, which parameters can be one or several values, into the risk model. These parameters can be generated based on one or several features or attributes of the student-user. The risk model, having received the input parameters, can then generate the risk value.

In some embodiments, the categorization model can determine a category of the student-user. In some embodiments, the categorization model can be used to generate one or several categorization values or identifiers that identify a category of the student-user. In some embodiments, this category can correspond to a likelihood of an intervention increasing or decreasing the risk value. In some embodiments, the categories can comprise a first category in which an intervention decreases the risk value, a second category in which an intervention increases the risk value, and a third category in which an intervention will not affect the risk value. In some embodiments, this third category can be further divided into a first group in which the student-users will likely fail to achieve the desired outcome regardless of intervention, and a second group in which the student-users will likely achieve the desired outcome regardless of intervention. In some embodiments, the categorization model can determine the category of the student-user through the input of one or several parameters relevant to the student-user into the categorization model. In some embodiments, these parameters can be generated from one or several features or attributes of the student-user that can be, for example, extracted from data relating to the student-user.

In some embodiments, the priority model can determine a priority value, which can be a prediction of the importance of any determined intervention. In some embodiments, this priority model can be determined based on information relating to the student-user for which the priority value is determined. In some embodiments, this priority value can be impacted by, for example, the value of the course associated with the risk value. In some embodiments, for example, the priority value may indicate a lower priority for a risk in a non-essential course. In such an embodiment, priority can be determined based on the credits of a course, based on the relevance of a course to, for example, a degree or major, based on the role of the course as a pre-requisite to subsequent courses, or the like.

A dashboard database 310 can include information for generating a dashboard. In some embodiments, this information can identify one or several dashboard formats and/or architectures. As used herein, a format refers to how data is presented in a web page, and an architecture refers to the data included in the web page and the format of that data. In some embodiments, the dashboard database 310 can comprise one or several pointers to other databases for retrieval of information for inclusion in the dashboard. Thus, in one embodiment, the dashboard database 310 can comprise a pointer to all or portions of the user profile database 301 to direct extraction of data from the user profile database 301 for inclusion in the dashboard.

A survey database 311 may include information relating to one or several surveys. In some embodiments, this can include information relating to the providing of one or several surveys and/or information gathered in response to one or several surveys. The information relating to providing one or several surveys can include, for example, information comprising one or several surveys and/or one or several questions, information identifying one or several survey recipients including, for example, one or several individual recipients or one or several groups of recipients such as, for example, one or several classes or portions of one or several classes, one or several frequencies for providing surveys, or the like. In some embodiments, the survey database 311 can include information identifying when to provide a survey, which information can include, for example, one or several triggers and one or several associated thresholds, also referred to herein as trigger thresholds. In one embodiment, these triggers comprise a plurality of triggers delineating between circumstances in which a survey is indicated for providing and circumstances in which a survey is not indicated for providing. In some embodiments, a survey should be provided to one or several user devices when a survey is indicated for providing, and a survey should not be provided to one or several user devices when a survey is not indicated for providing. In some embodiments, these one or several triggers can each be linked to one or several questions or surveys such that one or several questions or surveys can be selected for providing to users based on tripped triggers.

In some embodiments, these triggers can include, for example, a change in attendance and/or participation, including a decrease in attendance and/or participation, an increase in attendance and/or participation, attendance and/or participation above or below a threshold level, or the like, a change in student comprehension as indicated by a change in grades, performance, or the like, a change in positive and/or negative references to a class and/or teacher in social media, or the like.

In some embodiments, the information gathered in response to the one or several surveys can include, for example, user provided answers to one or several surveys, one or several survey questions, or the like. In some embodiments, this information can be linked to the user source of the information, and in some embodiments, this information can be separated from the user source of the information.

The survey information database 311 can comprise a single database or a plurality of databases such as, for example, a question database and/or a trigger database. In some embodiments, the question database can include a plurality of questions that can be organized according to one or several parameters. These parameters can include, one or several associated triggers, one or several levels of specificity, and/or one or several questioned subject matter. Thus, in some embodiments, some or all of the questions in the question database can be associated with a value linking the each of the some or all of the questions with one or several triggers stored in the trigger database. Further, each of the questions can include a value associating the question with a questioned subject matter, which question subject matter can be, for example, an area of the course about which the question is intended to gather information via student response. These areas of the course can include, for example, the teacher's teaching style (i.e. how the teacher is teaching), the appropriateness/successfulness of the course assignments, the quality and/or value of the course content, and/or the teacher's approach and/or interaction with one or several students. The question database can further include one or several values identifying the specificity of each question in the question database. This value identifying specificity can result in the creation of a tree-like structure of questions, with some trunk-questions identified as being directed to broad areas, and other branch-questions identified as being directed to one or several portions of the broad areas identified by one or several of the trunk-questions. This tree-like structure can contain multiple levels of child-questions directed to a portion of the subject area of their parent questions, and these multiple levels can be repeated until a desire level of specificity is attained.

In some embodiments, the entirety of the data contained in the survey information database 311 can be stored in a single memory such as, for example, within a single memory tier, and in some embodiments, the data contained in the survey information database 311 can be stored in multiple memories such as, for example, within multiple tiers of memory. In some embodiments, dividing the data contained in the survey information database 311 into multiple tiers of memory can allow efficient use of storage resources by placing items that are desired to be quickly accessible in lower tiers than information that is not desired to be as quickly accessible.

The survey database 311 can include information identifying the student's performance in evaluating the teacher, the course, and/or the course material, as well as identifying the student's performance in academic portions of the class. In some embodiments, the survey database 311 includes information identifying the student's performance evaluating the teacher, course, and/or the course material and does not include information relating to the student's academic performance. This data may indicate the amount of time spent by the student in completing past surveys, indicate the number of written comments, or the like.

The survey database 311 can include one or several evaluations and/or evaluation reports. In some embodiments, the evaluations and/or evaluation reports can be an aggregate of data relating to teacher performance, material performance, and/or course performance.

In some embodiments, the survey database 311 can include information relating to provided feedback relating to a teacher, a course, and/or learning materials. In some embodiments, for example, this feedback can include one or several recommendations, including, for example, one or several recommended additional and/or replacement materials, one or several material changes, one or several recommended teacher improvement resources such as, for example, papers, books, courses, training, seminars, or the like, which improvement resources can relate to management, organization, speaking, educational and/or instructional techniques, or the like.

In some embodiments, the survey database 311 can be divided into a first portion comprising first memory components and a second portion comprising second memory components. In some embodiments, the first portion can comprise relatively faster memory components and the second portion can comprise relatively slower memory components. Thus, in one embodiment, the first portion can comprise tier 0 or tier 1 memory components and the second portion can comprise tier 1 or tier 2 memory components. In some embodiments, data from the survey database 311 can be divided between the first and second portions based on whether the data is used for real-time analysis. Thus, data used for real-time analysis can be stored in the first portion and data that is not used for real-time analysis can be stored in the second portion. In one such embodiment a set of the triggers from the trigger database that can be used to indicate a time-sensitive desire for providing a survey can be stored within the first portion of the survey database 311, and a set of the triggers from the trigger database that can be used to indicate a non-time-sensitive desire for providing a survey can be stored within the second portion of the survey database 311.

In addition to the illustrative databases described above, database server(s) 104 may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party databases containing demographic data, education related data, consumer sales data, health related data, and the like. Illustrative external data aggregators 312 may include, for example, social networking web servers, public records databases, learning management systems, educational institution servers, business servers, consumer sales databases, medical record databases, etc. Data retrieved from various external data aggregators 312 may be used to verify and update user account information, suggest user content, and perform user and content evaluations.

Figure 4A:
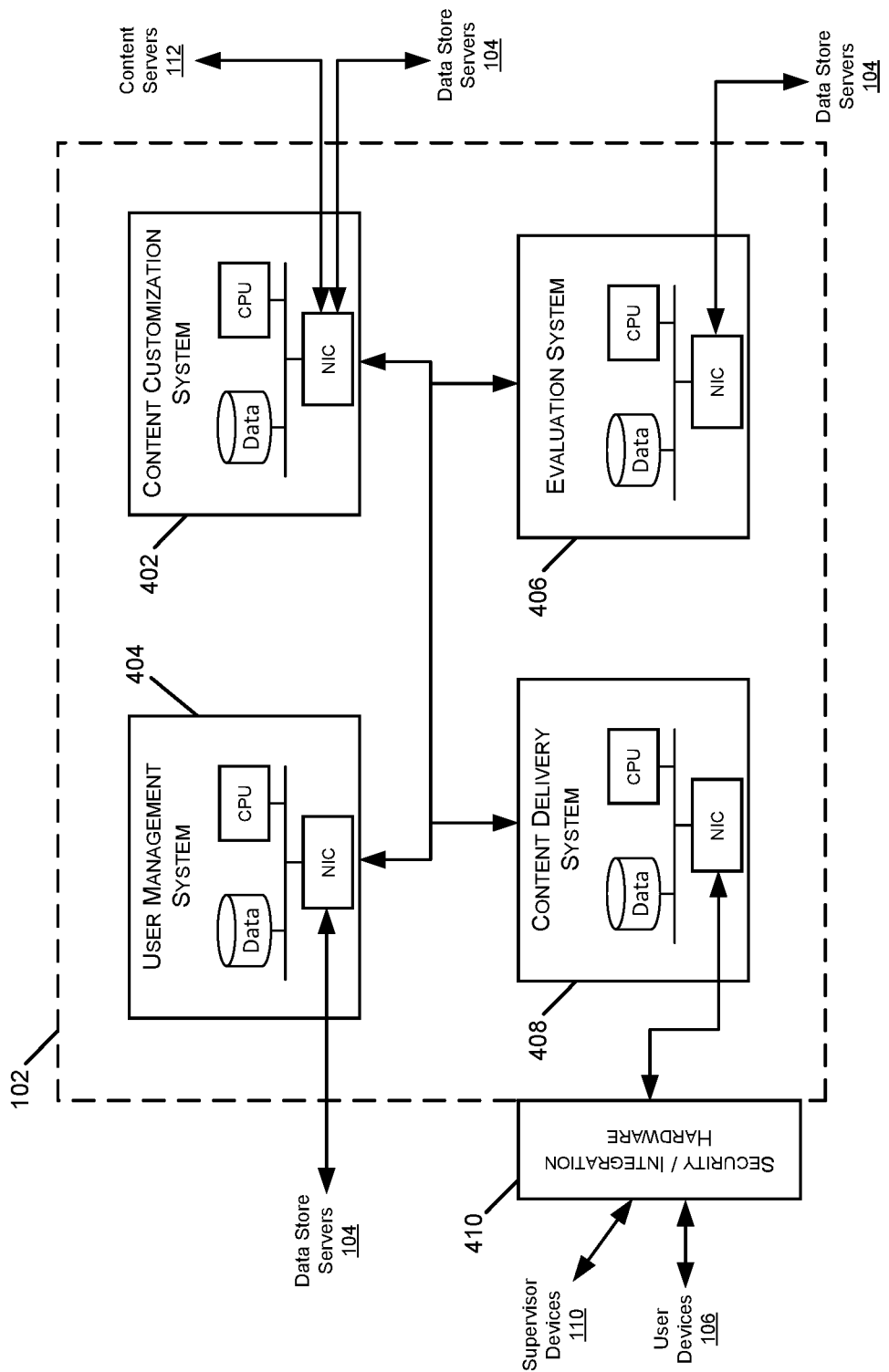
FIG. 4A is a block diagram illustrating an embodiment of one or more content management servers within a content distribution network.

With reference now to FIG. 4A, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), previous user results and content evaluations (e.g., from an evaluation database 308), and the like. Based on the retrieved information from databases 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a database (e.g., a content library database 303 and/or evaluation database 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
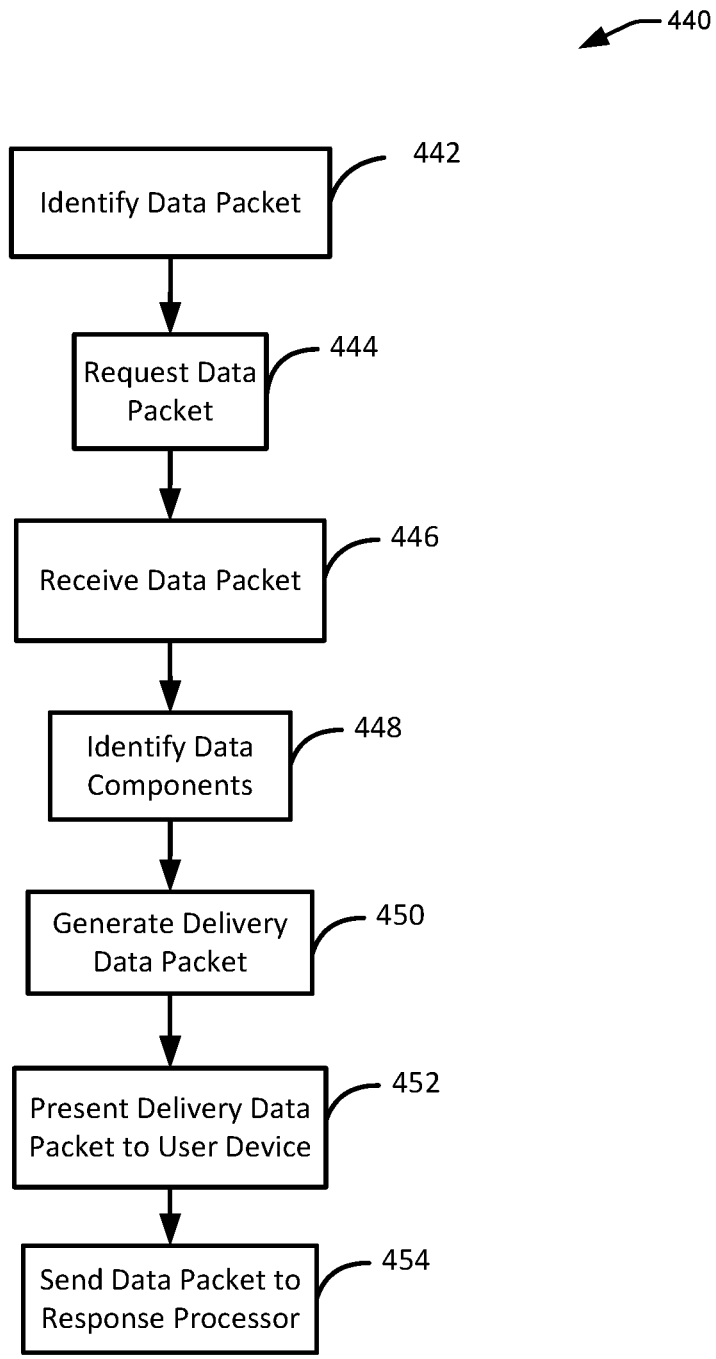
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
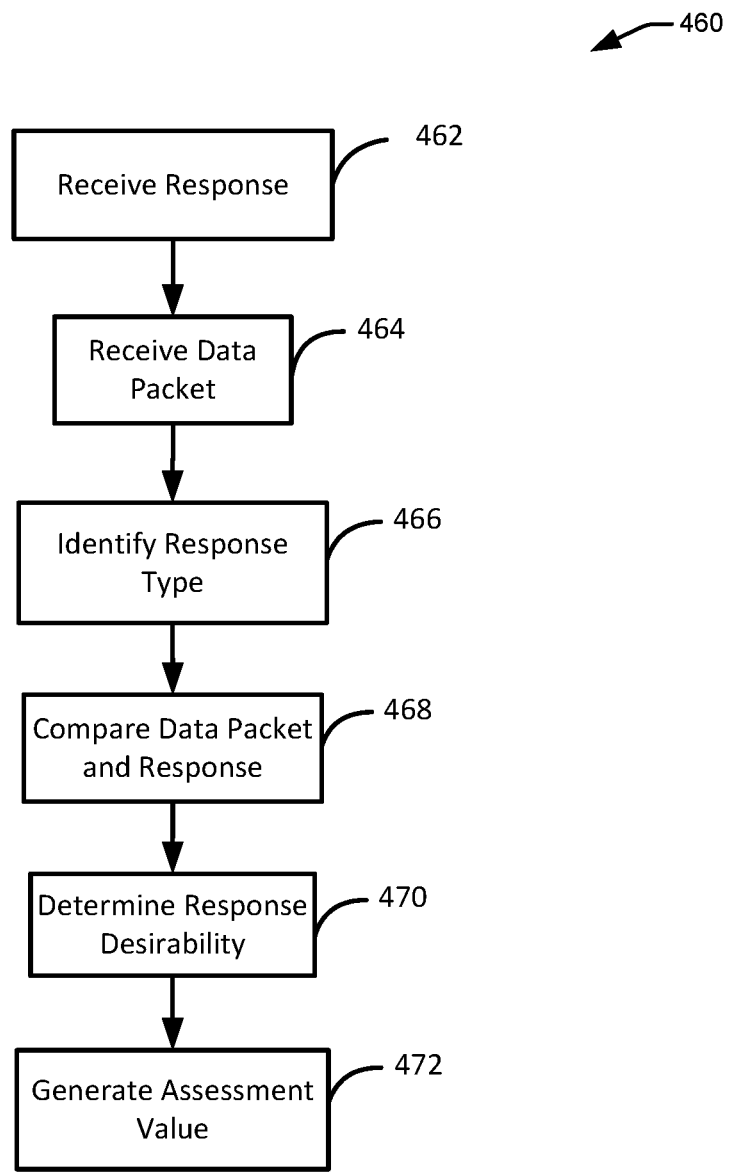
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 5:
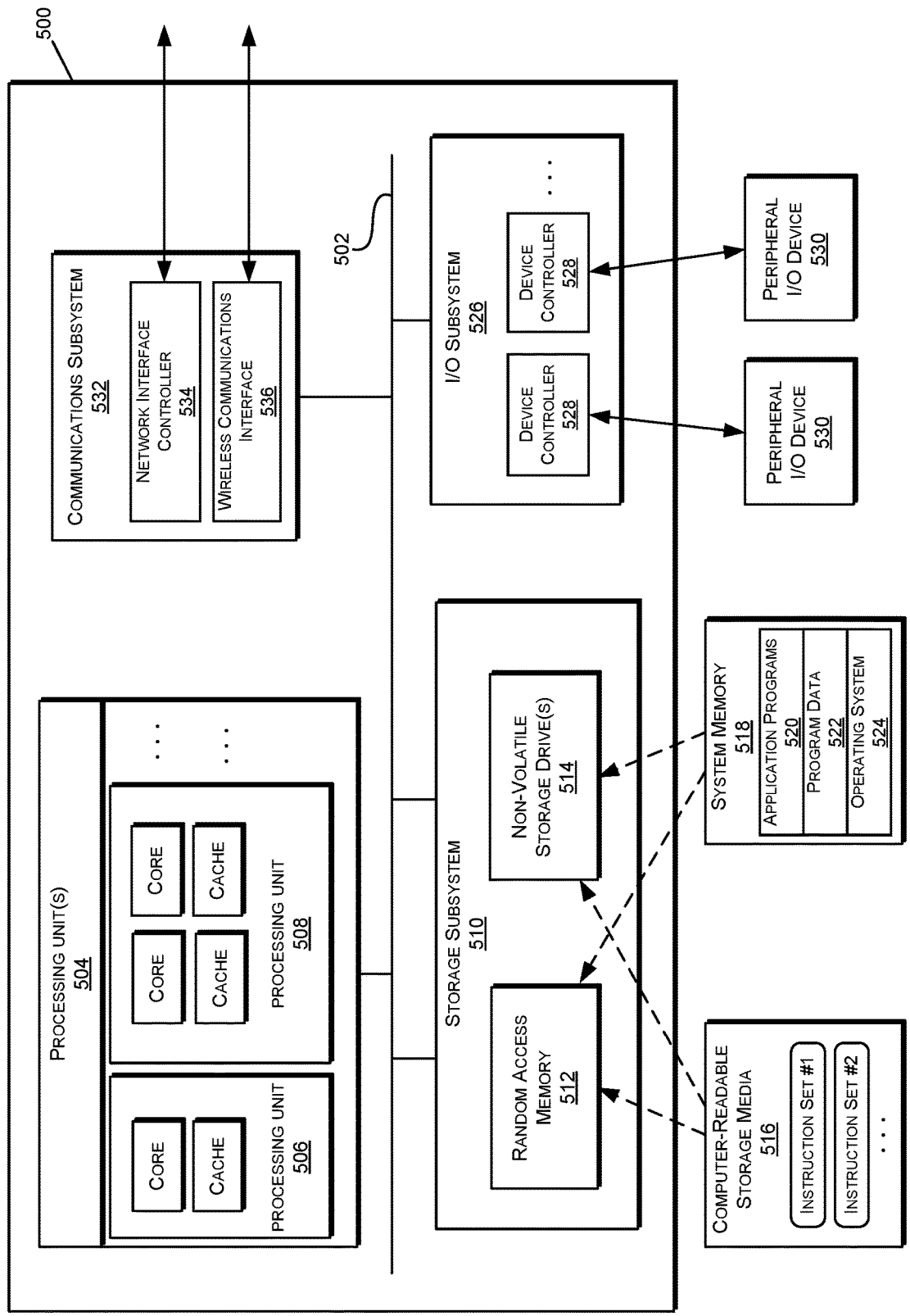
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
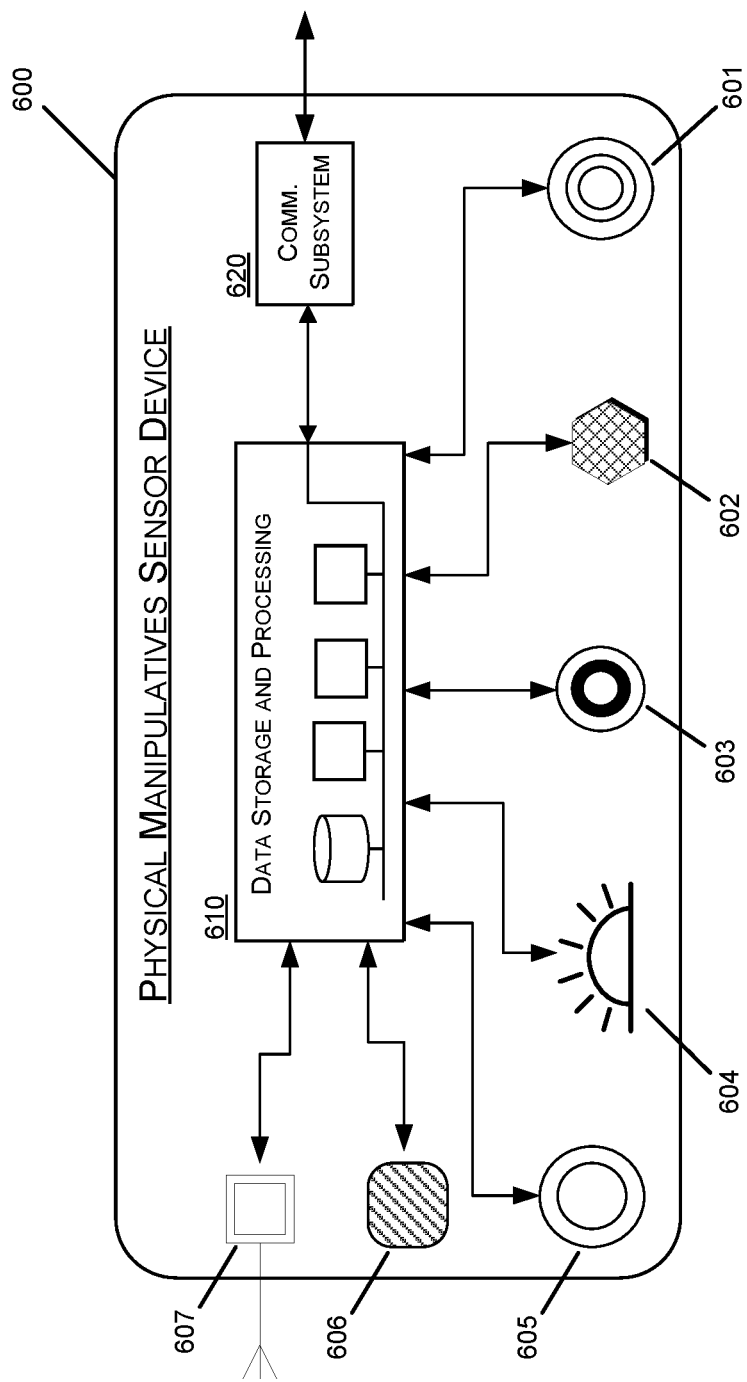
FIG. 6 is a block diagram illustrating an example of a physical manipulative sensor device, according to one or more embodiments of the disclosure.

With reference now to FIG. 6, a block diagram is shown illustrating an example device 600 for detecting, tracking, and recording data associated with physical manipulatives. As noted above, physical manipulatives may include any physical objects that can be interacted with and/or manipulated by users, providing various visual, audio, and tactile experiences for users. Examples of the types and characteristics of physical manipulatives are discussed in more detail below in reference to FIG. 7. Computing device 600 represents just one example of many possible designs and implementations of physical manipulative sensing devices. In this example, device 600 includes a plurality of sensors 601-607, processing units and data storage subsystems 610, and a communication subsystem 620. However, it should be understood that device 600 may include some or all of the additional hardware, software, and networking components discussed above in reference to FIGS. 1-5, such as secure data storage and secure networking and data transmission, for example, any of the devices and components discussed above in reference to security and integration components 208 and/or communication networks 220.

In some embodiments, the physical manipulatives sensor device 600 illustrated in this example may be integrated within (or configured to operate in collaboration with) one or more content distribution networks 100. For example, device 600 may be a user device 106, or may operate as a peripheral or subsystem/subcomponent within a user device 106, in any of the content distribution network (CDNs) 100 described above. Thus, in various embodiments, physical manipulatives sensor devices 600 may operate as (or with) user devices 106 within educational and professional training systems and networks, interactive gaming systems and networks, media distribution systems and networks, and enterprise application systems and networks, websites and other Internet-based systems and networks. In such cases, devices 600 may communicate with supervisor devices 110 (e.g., presenter devices, teacher devices, administrator devices), content management servers 102, and other devices, to initiate requests for content resources, receive and interact with content resources, and/or transmit feedback relating to content resources. In order to perform such features, each of the sensors 601-607 and other components 610-630 discussed in the example device 600 may be implemented in hardware, software, or a combination thereof. Further, each sensor 601-607 may be integrated within the device 600, or may be implemented as a separate peripheral sensor device configured to communicate with device 600.

Each sensor 601-607 may be configured to detect, receive, and store data from or relating to a set of physical manipulatives located proximately to the device 600. Nonetheless, each sensor 601-607 may include its own set of specialized hardware and/or software components depending on the sensor functions and capabilities of the specific sensor device. Sensor 601 may include a camera configured to receive visual images and/or video of physical manipulatives within its field of view. Camera 601 may include, for example, a 4-, 8-, or 16-megapixel front facing, fixed focus camera. Sensors 603 and 605 may include additional cameras integrated within or attachable to the device 600. As discussed in more detail below, certain physical manipulatives sensor devices 600 may include multiple cameras to perform different functions and/or collect visual data from different reference points. For instance, camera 603 may be a Red-Green-Blue infrared (RGB-IR) camera with specialized motion tracking hardware and capabilities, while cameras 601 and 605 are standard digital cameras within motion tracking capabilities. In some cases, each camera 601, 603, and 605 may have different lenses, image capture capabilities, and configurations (e.g., different narrow-angle, wide-angle, or fish-eye lenses, different lens types, different resolutions and color capabilities, different video capabilities, etc.). Additionally, because camera 601, 603, and 605 may be positioned at different locations on the device 600, each camera may have a different field of vision. Thus, data from different cameras 601, 603, and 605 may be analyzed collectively to determine depth and perform 3D analyses of the physical manipulatives.

Sensor 602 is this example includes a microphone configured to receive and record voice descriptions and other sounds from users while interacting with physical manipulatives, as well as sounds emitted by the physical manipulatives themselves. Sensor 604 may include a depth sensor configured to determine the distance of physical manipulatives from the device 600, thereby allowing the device 600 perform determinations on the size, height, angle, and 3D shape of physical manipulatives or groups of manipulatives (e.g., stacked or joined objects) that might be difficult or impossible to detect without a depth sensor 604. In some embodiments, depth sensor 604 may be implemented using an infrared (IR) laser projector along with a corresponding CCD (charge coupled device) or CMOS (complementary metal oxide semiconductor) image sensor. Sensor 606 may include an ambient light sensor which may be used in conjunction with other visual sensors (e.g., cameras, depth sensors, etc.). Sensor 607 may include a radio-frequency (RF) transceiver configured to transmit data signals to and/or receive data signals from physical manipulatives. Some physical manipulatives may include hardware, circuitry, and/or programmed logic to transmit signals to the device 600 and/or other user devices. In some cases, physical manipulatives may be equipped with unique radio-frequency identification (RFID) tags. These and other "smart" physical manipulatives may transmit data to device 600 indicating movement, current position, velocity and/or acceleration, proximity or contact with other physical manipulatives, and the like. In this example, the data signals from smart physical manipulatives may be received via an RF transceiver or other wireless communication receiver. In some embodiments, smart physical manipulatives may be used with non-smart physical manipulatives. For example, a specialized set of smart physical manipulatives having embedded RFID tags may be detected by one or more RFID readers of the sensor device 600. However, users also may provide their own set of physical manipulatives that do not have RFID tags or any other specialized embedded circuitry to facilitate communication with the sensor device 600. In this case, the sensor device 600 may identify a use a certain set of sensors (e.g., RFID reader) to detect and communicate with certain physical manipulatives, while using a different set of sensors (e.g., cameras and/or depth sensors) to detect other physical manipulatives.

Although device 600 shows only sensors 601-607, in this example and other embodiments, many additional types of sensors and/or alternative sets of sensor combinations may be used. For example, in some embodiments, a physical manipulative sensing device 600 may include one or more sensors to detect position and/or movement of the device 600 itself, in addition to (or alternatively to) detecting position and movement of nearby physical manipulatives. Such sensors may include gyroscopes, compasses, barometers, accelerometers, and/or digital positioning systems such as Global Position Satellite (GPS) receivers. Sensors that detect position and/or movement of the device 600 itself may be advantageous in embodiments where the device 600 might not be static, and thus a change in data recorded for a physical manipulative (e.g., camera data, movement data, depth data, etc.) might indicate that the physical manipulative has moved, or the device 600 itself has moved and while physical manipulative has remained stationary, or that both the device 600 and the physical manipulative have moved. Sensors detect position and/or movement of the device 600 may be used to distinguish these possibilities.

Different types of motion sensors may be included, additionally or alternatively, into physical manipulative sensing devices 600. As discussed above, motion sensor 603 may use optical devices such as still cameras and video camera to detect motion. However, other types of motion sensors may include, for example, infrared motion detection using passive and/or active infrared sensors, radio frequency (RF) energy motion detection systems, sound-based motion detection systems using one or more microphones and/or acoustic sensors, vibration-based motion detection systems using triboelectric, seismic, and/or inertia-switch sensors, and magnetism-based motion detection systems using magnetic sensors and magnetometers.

Additional sensors and/or receiving systems also may be included in physical manipulative sensing devices 600 to receive communications transmitted by proximately located physical manipulatives. As discussed above, an RF transceiver 607 may be used to receive data signals from physical manipulatives having embedded RFID tags. However, in other embodiments, devices 600 may receive wireless transmissions from physical manipulatives via WiFi, Bluetooth, near-field communication (NFC) and other wireless communication technologies. As discussed below, physical manipulatives in such embodiments may include sensors to collect their own position and movement data, and proximity and contact with other physical manipulatives, and a wireless transceiver to transmit the data to the device and/or other devices.

Figure 7:
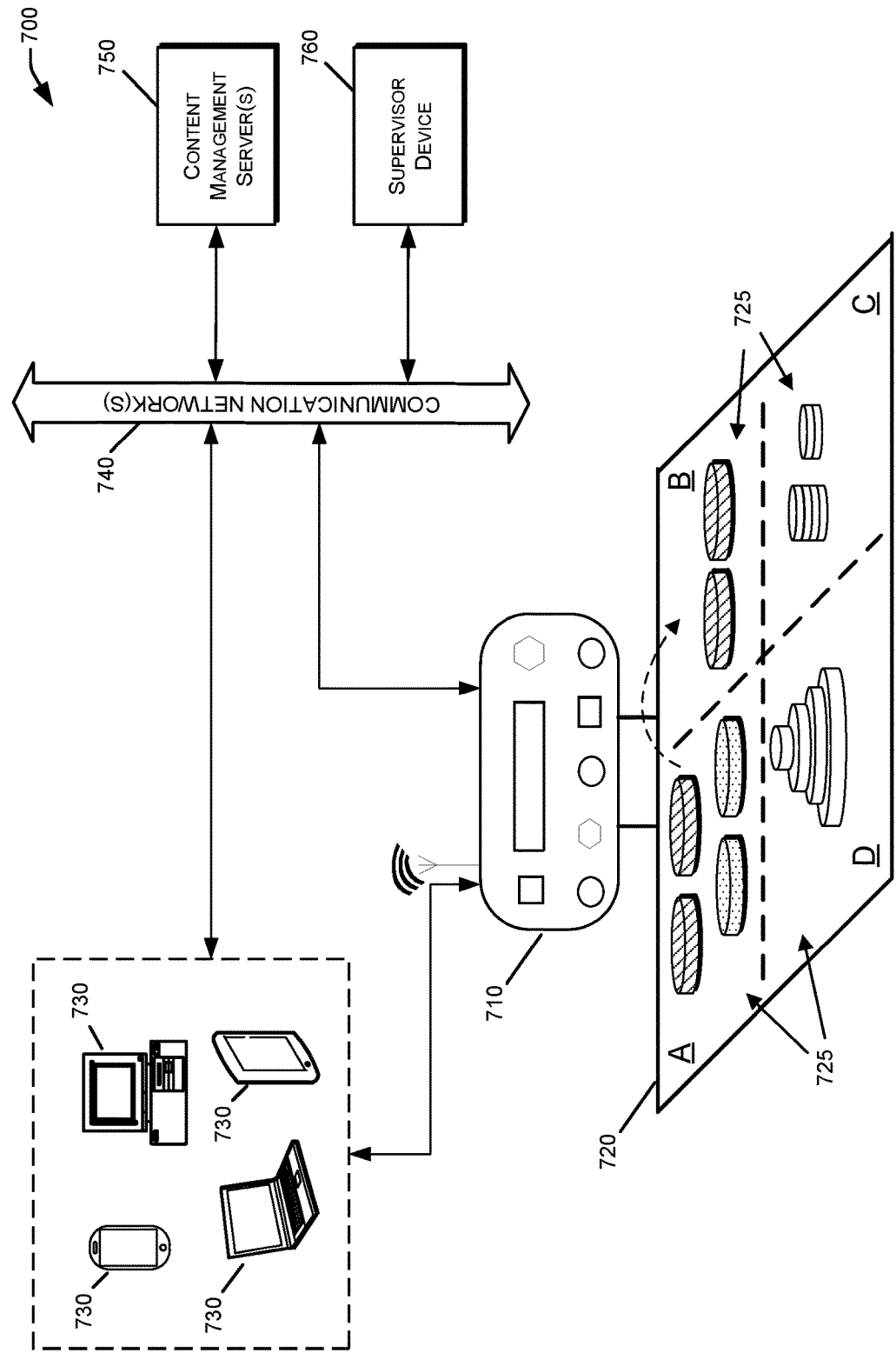
FIGS. 7 and 8 are block diagrams illustrating one or more examples of systems for interacting with augmented physical and virtual manipulatives, according to one or more embodiments of the disclosure.

With reference now to FIG. 7, a block diagram is shown illustrating an example system 700 including a physical manipulative sensing device 710, one or more user devices 730, a content management server 750, and a supervisor device 760 connected via a communication network 740. In this example, device 710 may correspond to the physical manipulative sensing device 600 discussed above. User devices 730 may include desktop or laptop computers, mobile devices, and other various computing devices/systems, including some or all of the hardware, software, and networking components discussed above in connection with user devices 106. In some embodiments, physical manipulative sensing devices 710 may be integrated into user devices 730, or certain user devices 730 (e.g., smartphones, tablet computers, etc.) having a standard set of sensors and other device capabilities may be used as physical manipulative sensing devices 710. Communication network 740 may correspond to any network or combination of networks discussed above in reference to communication network 220, including TCP/IP packet-based computer networks, telecommunication networks, wireless networks, etc.

Device 710 and/or user devices 730 may communicate with one or more content management servers 750 and one or more supervisor devices 760 via one or more communication network 740. Content management server (CMS) 750 may include some or all of the hardware, software, and networking components discussed above in connection with content management servers 102. CMS 750 may, for example, receive requests for content resources, provide content resources in response to device 710 and/or user devices 730, and also may receive and response to user feedback regarding various content resources. Supervisor devices 760 may include some or all of the hardware, software, and networking components as user devices 730, but may be configured to operate in a different mode or different role. For example, supervisor devices 760 may include presenter devices, teacher devices, administrator devices, and the like. As discussed below, CMS 750 and supervisor devices 760 may request and receive user interaction data and feedback data from device 710 and/or user devices 730 regarding user interactions with physical manipulatives and related virtual manipulatives, and may also provide updated content and/or instructions for using the physical and virtual manipulatives.

As discussed above, device 710 may detect, track, and record data associated with one or more physical manipulatives within the proximity of the device 710. In this example, several different physical manipulatives 725 are shown on a physical mat 720. Physical manipulatives 725 as described herein may include any physical objects that may be interacted with and/or manipulated by users. For instance, in systems 700 used for online interactive gaming, physical manipulatives 725 may include balls and other sports equipment, game weapons, playing cards, dice, checkers, board game pieces, and the like. In other examples, in systems 700 used for professional training and eLearning, physical manipulatives 725 may include building materials for 2-dimensional and 3-dimensional construction, letter or number tiles, counters, place value blocks, coins or paper money, blocks, snap cubes, fraction bars, pattern blocks, stackable objects, bendable objects, and the like.

In some embodiments, the physical manipulatives 725 may be a predetermined set of objects, and device 710 may be preprogrammed to recognize the predetermined objects and detect position/movement of the objects. When predetermined sets of physical manipulatives 725 are used, the device 710 may know in advance the sizes, shapes, colors, weights, etc., of each physical manipulative 725, allowing the device 710 to more easily identify and determine the position and movement of the physical manipulatives 725. However, in other embodiments, physical manipulatives 725 need not be predetermined and preprogrammed into the device, thereby allowing users to provide any physical manipulatives 725 appropriate for a desired user interaction. In such cases, users may introduce any new set of physical manipulatives 725, for example, a set of coins and paper money, materials from a model building kit, or a set of stackable colored blocks, etc., by placing the new physical manipulatives 725 onto the mat 720. After the physical manipulatives 725 are initially placed onto the map 720 and left stationary for a brief period of time (e.g., 1 second, 2 seconds, etc.), the device 710 may automatically active its various sensors 601-607 to determine the size (in two or three dimensions), shape, color, patterns, characters, and the like, for each physical manipulative 725 introduced onto the physical mat 720. The device 710 may store this data as a profile of each new physical manipulative 725, along with the starting position of the physical manipulative 725. When these physical manipulatives 725 are moved from one place to another on the physical mat 720, or removed from the mat 720 and later reintroduced, the previously stored profile data (e.g., sizes, shapes, colors, patterns, characters, weights, etc.) may be used to identify the objects so that movement data and user interactions may be recorded accurately.

In some cases, a sensing device 710 and/or user device 730 also may assign values to physical manipulatives 725 based on the identification of the physical manipulative 725, as well as a current context of the system 700. The current context of a CDN 700 using physical and/or virtual manipulatives may refer to the type and functional purpose of the CDN 700 (e.g., a gaming CDN 700, an eLearning CDN 700, and interactive-media distribution CDN 700, etc.) as well as the particular content resources (e.g., media, software, etc.) that the user is executing and interacting with via the physical and/or virtual manipulatives. Different physical manipulatives 725 (and virtual manipulatives, discussed below) may have different meanings and may be assigned different values depending on the current context of the system 700. For example, in an eLearning CDN 700 executing mathematical tutorial content resources received from the server 750, then a specific physical manipulative 725 (e.g., a triangle power polygon) may have a first value (e.g., value=1) in the context of a counting tutorial, but may have second value (e.g., value=1/6) in the context of a fractions tutorial (e.g., in which the triangle power polygon represents one-sixth of a larger hexagonal polygon). As another example, in an online gaming CDN 700, a physical game piece 725 in the form of a soldier may represent a single soldier (e.g., value=1) in some games, levels, modules, and versions, but alternatively may represent one company (e.g., value=200), one battalion (e.g., value=800), or one division (e.g., value=10,000), etc., in the context of different games, levels, modules, or versions. Thus, device 710 and/or user device 730 may determine a value for each physical manipulative 725 (and/or for each virtual manipulative) based on the identification of the physical manipulative 725 itself, and also based on the current context of the CDN 700. Such determinations of the value of physical manipulative 725 may be performed both for predetermined physical manipulatives 725 (e.g., objects that the sensing device 710 is preprogrammed to recognize), and also for physical manipulatives 725 that are not predetermined or preprogrammed into the device 710 (e.g., physical manipulatives 725 provided by users).

Different types of physical manipulatives 725 also may provide different visual, audio, and tactile experiences for users, for example, by having distinct sizes, shapes, sounds, colors, textures, weights, and the like. Additionally, certain physical manipulatives 725 may be designed to interact with other physical manipulatives, such as magnetic or stackable objects 725, interlocking or puzzle piece objects 725, or any other attachable physical objects 725. In some embodiments, physical manipulatives 725 may contain hardware elements and computing circuits and/or programming code configured to emit sounds and/or alter the appearance of a physical manipulatives in response to touch, movement, proximity to specific other physical manipulatives, contact with specific other physical manipulatives, and the like.

In some embodiments, physical manipulatives 725 also may include internal sensors and/or wireless transmitters to communicate position data, movement data, and interactions with other manipulatives 725 to the device 710. For example, certain physical manipulatives 725 may include accelerometers, gyroscopes, compasses, and/or other movement detectors to determine when the physical manipulative 725 has been moved. In some cases, a physical manipulative 725 may use a downward-facing light source and related light sensor to detect movement of the object 725 relative to the stationary mat 720. To determine a current position of the physical manipulative 725, various position sensors may be integrated within the manipulative 725, including linear, angular, or multi-axis position sensors, as well as GPS receivers and other electronic positioning systems. Additionally, physical manipulatives 725 may include proximity sensors to detect the distance and relative location of other nearby physical manipulatives 725. Thus, a manipulative 725 may determine when another manipulative 725 is nearby, approaching, moving away, contacting and adjacent to, on top of, beneath, etc. In such examples, these "smart" physical manipulatives 725 (i.e., manipulatives with internal sensors, hardware, circuitry, and/or programmed logic) may transmit the data collected to the device 710 and/or other smart physical manipulatives 725 nearby. Additionally, in some cases, smart physical manipulatives 725 may transmit data to and/or receive data from a content management server 750, a supervisor data 760, or other remote devices with a CDN system 700. Thus, these physical manipulatives 725 may include one or more wireless transceivers, such as RF transceivers, RFID tags, WiFi transmitters, Bluetooth transceivers, and the like.

Physical mat 720 may be specifically designed for use with physical manipulatives sensor device 710 and/or the physical manipulatives 725, or alternatively may be any physical mat 720 of a uniform height and/or sufficient color contrast to allow the device 710 to adequately sense the position, movement, and interaction of physical manipulatives 725 on the mat. In this example, physical mat 720 is designed with four quadrants ("A", "B", "C", and "D") each of which contains a set of physical manipulatives 725. The device 710 may detect the different quadrants (and/or other different regions) of the physical mat 720, and may determine which physical manipulatives 725 are in which quadrants and when a manipulative 725 moves into a different quadrant. For instance, when the user moves two physical manipulatives 725 from quadrant A to quadrant B, as shown in this example, device 710 may detect the movement, identify the color and/or pattern of the physical manipulatives 725 that were moved, and identify the new locations of the physical manipulatives 725 in quadrant B.

In some embodiments, the physical mat 720 may include sensors, hardware, circuitry, and/or programmed logic to detect the position and/or movement of the physical manipulatives 725, and proximity and interactions between multiple physical manipulatives 725. In such cases, the physical mat 720 also may include a communication subsystem with a network interface and transceiver(s) to communicate with the physical manipulatives 725, the device 710, and/or other remote servers or devices in the system 700. For example, the physical mat 720 may include internal weight sensors, magnetic sensors, RF sensors, and the like, to detect the position, movement, and interaction between (e.g., grouping or stacking) physical manipulatives 725. When the sensors of the physical mat 720 detect an updated position, movement, or interaction between physical manipulatives 725, it may record and transmit the updated data to the device 710 and/or user devices 730.

Figure 8:
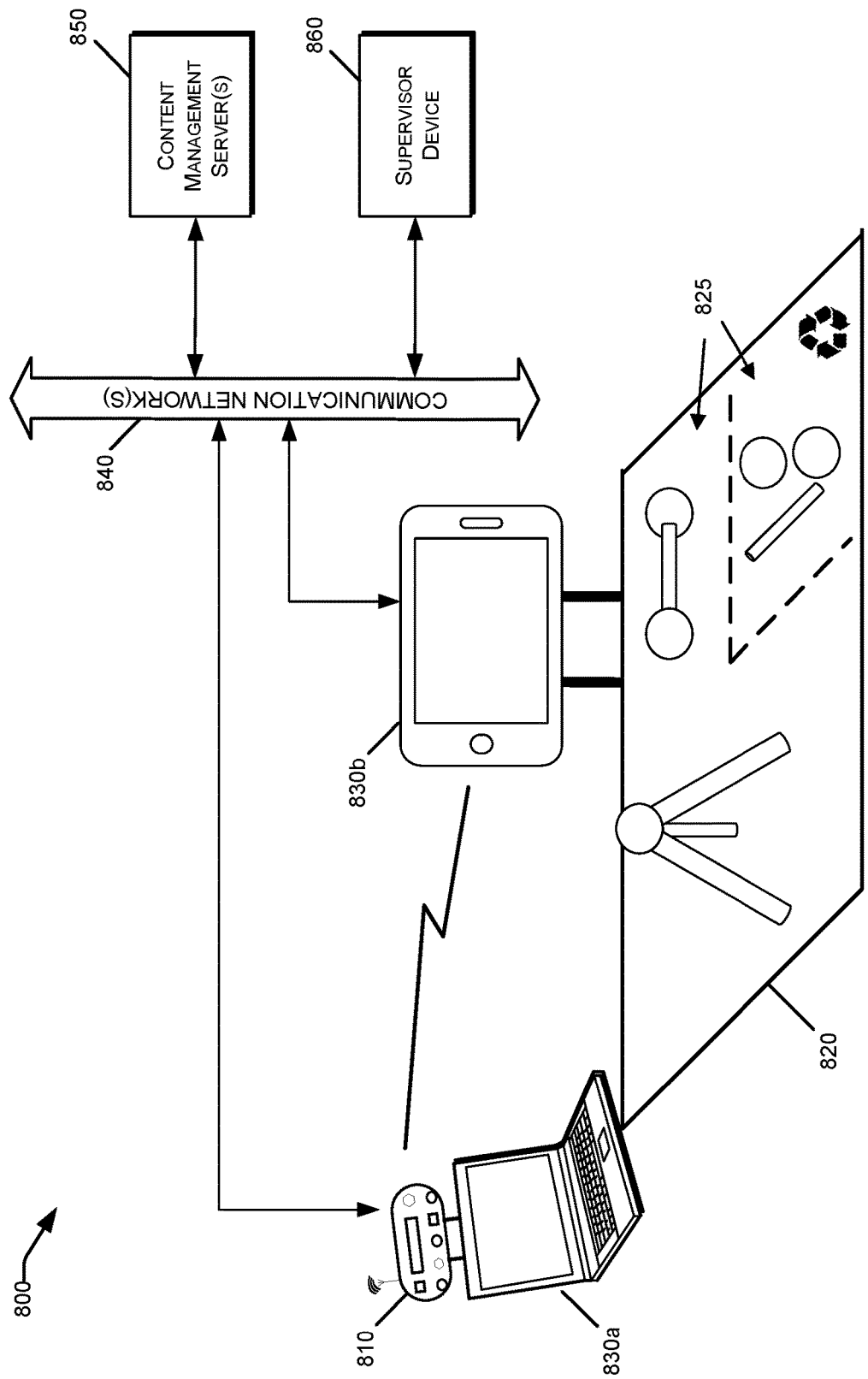

Referring now to FIG. 8, a block diagram is shown illustrating another example system 800 including a physical manipulative sensing device 810, multiple user devices 830*a* and 830*b*, a content management server 850, and a supervisor device 860 connected via a communication network 840. In this example, device 810 may be similar or identical to physical manipulative sensing device 600 discussed above. In this example, two user devices 830*a* and 830*b* (collectively 830) are shown, but different numbers and types of users devices 830 may be used in different embodiments, including various combinations of desktop and laptop computers, tablet computers, mobile devices, wearable computing devices, and/or other various computing devices/systems. Each user device 830 may include some or all of the hardware, software, and networking components discussed above in connection with user devices 106. Communication network 840 may correspond to any network or combination of networks discussed above in reference to communication network 220, including TCP/IP packet-based computer networks, telecommunication networks, wireless networks, etc.

Although system 800 includes similar components to those described above in system 700, in this example a combination of devices 810 and 830 may be used to detect, track, and store the data relating to the physical manipulatives 825. In this example, a physical manipulative sensing device 810 is connected to a user laptop 830b. Device 810 may be physically mounted (or otherwise attached) to user devices 830, and in some cases also may be electronically connected to one or more user devices 830 in order to share visual image data, sensor data, and/or network capabilities and other computing functions. For instance, in some embodiments, device 810 might not include a data storage and processing system 610 and/or a communication subsystem 620, but instead may leverage the computing resources of the connected user device 830 to perform its data storage, processing, and data transmission functions.

In this example, the device 810 is also in communication with a second user device 830b. User device 830b, a tablet computer in this case, is positioned on a different side of the physical mat 820 from the device 810. Tablet computer 830b may include one or more cameras and/or additional sensors to detect and track the physical manipulatives 825 on the mat 820. Because the device 810 and tablet 830b are located on different sides of the physical mat 820, they may collect images, video, and other sensor data from different positions and angles with respect to the physical manipulatives 825. Tablet computer 830b may transmit its visual/sensor data to the device 810, or vice versa, so that the combined visual/sensor data may be used to better analyze depth, height, and proximity/contact between physical manipulatives 825. For example, the multiple angle image/video data from the tablet computer 830b and device 810 may be synchronized and analyzed concurrently to determine precise position data (in the x, y, and z-axis), height data, proximity data, and contact (e.g., adjacent objects, stacked objects, etc.) for each physical manipulative 825 on the mat 820.

Another potential advantage of using multiple devices 810 and 830 to detect data regarding the physical manipulatives 825, is that separately positioned devices may provide additional angles and perspectives and thus may allow the physical manipulative sensing device 810 to require fewer cameras and other sensors 601-607. For instance, in some embodiments, device 810 may include only a single camera (or even no cameras), but may receive and process image data from multiple different user devices 830 positioned at different locations/angles proximate to the physical mat 820.

Figure 9:
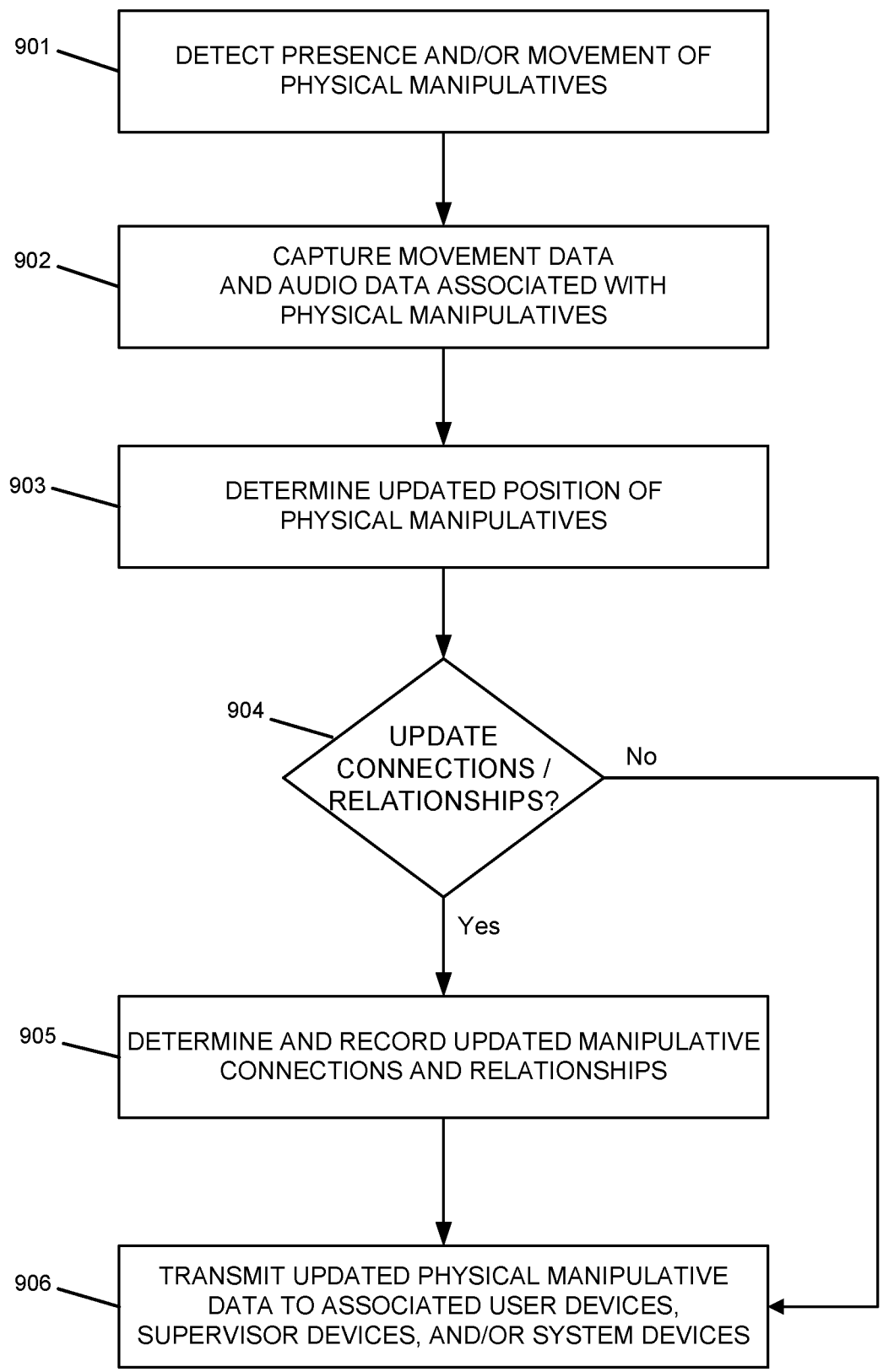
FIG. 9 is a flow diagram illustrating an example process of monitoring and reporting data relating to a set of physical manipulatives using a physical manipulative sensor device, according to one or more embodiments of the disclosure.

Referring now to FIG. 9, a flow diagram is shown illustrating a process of monitoring and reporting data relating to a set of physical manipulatives. As described below, the steps in this process may be performed by one or more computing devices, such as a physical manipulative sensor device (e.g., 600, 710, or 810) and/or user devices (e.g., 730 or 830), within systems and CDNs such as 700 and 800 described above. However, it should be understood that the processes of detecting and monitoring physical manipulatives, and transmitting corresponding data relating to physical manipulatives need not be limited to the specific systems and hardware implementations described above in FIGS. 1-8, but may be performed within other computing environments comprising other combinations of the hardware and software components described herein.

In step 901, one or more physical manipulative sensor devices 600 (e.g., devices 710 or 810) and/or user devices 106 (e.g., devices 730 or 830) may detect the presence and/or movement of a nearby physical manipulative object 725 (or 825). For example, when a physical manipulative 725 is introduced, removed, reintroduced, manipulated, or moved to a different location within a sensing environment of a sensing device 600, the device 600 may detect the presence of the physical manipulative 725. The sensing environment of device 600 may correspond to a physical mat 720 or 820, or may include any physical location within the proximity and range of one or more cameras or sensors of the device 600. After detecting the presence and/or movement of a physical manipulative 725, the device 600 may identify the physical manipulative based on size, shape, color, weight, RFID, etc., or using any other sensors and techniques described herein. As described above, the device 600 and/or user devices 106 also may assign a value to the identified physical manipulative 725, based on the physical manipulative 725 itself as well as based on the current context of the CDN system. Additionally, the device 600 also may determine an initial position and orientation of the physical manipulative 725, along with the initial configuration of the manipulative (e.g., for flexible, changeable, or reconfigurable manipulatives 725).

In order to detect the initial presence and/or movement of a physical manipulative 725, the sensing device 600 (and/or user devices 106) may use image data, video data, audio data, and/or any other data from any other sensors discussed above in connection with device 600. For instance, IR depth sensors or motion detectors, RFID tags, GPS, and any other sensors or techniques discussed above may be used in different embodiments. Additionally, as discussed above, the physical manipulatives 725 themselves and/or the physical mat 720 may be used to detect presence and/or movement within the sensing environment of device 600. For example, smart manipulatives 725 and/or smart mats 720 may include RFID tags and receives, motion and position sensors, weight sensors, and the like, in order to determine that a physical manipulative 725 has been introduced to or moved within a physical environment.

In step 902, the physical manipulative sensing device 600 and/or user devices 106 may capture movement data, audio data, and/or other data relating the physical manipulatives 725 detected in step 901. For example, device 600 may track and record the initial position, orientation, and configuration of a physical manipulative 725, along with the precise movement path of the physical manipulative 725 within the physical environment (e.g., on or above the physical mat 720). In some cases, the device 600 may activate addition sensors after initially detecting the presences or movement of a physical manipulative 725 in step 901. For instance, a microphone may be activated in response to the movement of a physical manipulative 725, and deactivated after its movement is complete (plus an additional time window in some cases) to allow the user to narrate the activity with descriptions and explanations of the movements being performed. Additionally sensors, such as device proximity sensors, contact sensors, RF receivers, mat weight sensors, etc., also may be activated in response to detecting the introduction or movement of a physical manipulative 725, in order to record all activities within the physical environment during the relevant time periods.

In step 903, the sensing device 600 may determine that the introduction and/or movement of a physical manipulative 725 has ceased, and that the physical manipulative 725 is now stationary within the physical environment (e.g., on or above the physical mat 720), or has been removed from the physical environment. At this point, the sensing device 600 (and/or user devices 106) may determine the ending position, orientation, and configuration of the physical manipulative 725. For example, as illustrated in FIG. 7, a physical manipulative 725 may be moved from one region of the physical mat 720 to another. In other cases, physical manipulatives 725 may be repositioned within a single region, flipped over or on edge, stacked, joined or attached with other physical manipulatives 725, and the like. The sensors 601-607 within the device 600, and/or various sensors in other devices (e.g., sensors within users devices 830, sensors within physical manipulatives 725 or mat 720, etc.) may detect and record any of these changes in position, orientation, and configuration for individual physical manipulatives 725, and for groups of nearby, stacked, and/or joined physical manipulatives 725.

In step 904, the sensing device 600 and/or user devices 106 may determine if any connections and/or relationships involving the physical manipulatives 725 have changed as a result of the movement of the physical manipulatives 725 discussed in steps 901-903. The connections and/or relationships determined in this step may include the relationship of a single physical manipulative 725 to the physical mat 720 (or other physical environment), or the relationship/connection between multiple different physical manipulatives 725. For example, the device 600 may determine in step 904 that a physical manipulative 725 has moved from one region of the physical mat 720 into another region. Another determination in step 904 may be that a physical manipulative 725 has been turned and/or changed orientation, for example, when a flat physical manipulative 725 (e.g., disc, checker, tile, playing card, etc.) has been flipped-over, or a multi-sided physical manipulative 725 (e.g., a die, pyramid, building object, etc.) has been reoriented by facing a different side up. Any such changes in the region, orientation, or configuration of a single physical manipulative 725 may cause a positive determination by the device 600 in step 904.

Additional determinations in step 904 may relate to changes in the relationships or connections between groups of two or more physical manipulatives 725. For example, a group of physical manipulatives 725 may be grouped together or separated (e.g., based on physical contact or close proximity), stacked or unstacked, or attached together (e.g., for physical manipulatives 725 configured to be interlocking, magnetically attracting or repelling, etc.). Any such changes in the relationships between two or more physical manipulatives 725 may cause a positive determination by the device 600 in step 904.

Although performing such determinations described above in step 904 may be optional, it may be advantageous in some embodiments so that more limited amounts of data relating to physical manipulatives 725 may be collected, stored, and transmitted. For example, rather than transmitting a complete set of raw three-dimensional position data and three-dimensional orientation data for each physical manipulative 725, it may be sufficient in some embodiments to transmit a smaller amount of summary data for the physical manipulatives 725. Such summary data may include, for example, which region a physical manipulatives 725 is positioned in on a physical mat 720, a simple up-down or upward-facing-side orientation, and any grouping, stacking, or connection relationships with other physical manipulatives 725. For instance, referring again to FIG. 7, it may be sufficient in some embodiments to determine and transmit data indicating that quadrant D contains four stacked physical manipulatives 725. Thus, data identifying the manipulatives, their up-down orientations, and the stacking order may be collected and transmitted, whereas the precise x-, y-, and z-axis position coordinates and precise three-dimensional orientations of each of the physical manipulative 725 might not be needed or desired information. Similarly, it may be sufficient in some cases to determine, store, and transmit information indicating that the two diagonal-patterned physical manipulatives 725 were moved from quadrant A to quadrant B, without needing to store or transmit the specific position, orientation, and configuration of the physical manipulatives 725. Of course, in other embodiments, it may be advantageous and/or required for augmented physical and virtual manipulative systems 700 to determine, store, and transmit precise position, orientation, and configuration data for any physical manipulative 725 added to, removed from, or altered within the physical environment.

In step 905, any updated connections and/or relationships involving one or more physical manipulatives (904:Yes) may be determined and recorded by the device 600. As noted above, such updates may include changes to the region, orientation, or configuration of a single physical manipulative 725, and may include changes in the relationships (e.g., grouping, stacking, connecting, etc.) between multiple physical manipulatives 725. Device 600 and/or one or more user devices 106 may determine and record such changes.

In step 906, some or all of the updated data captured and determinations performed in steps 901-905 may be transmitted by the device 600 to user devices 106 and/or various additional servers or devices (e.g., content management server 750, supervisor device 760, etc.). As discussed below in more detail, recipients of the transmitted data in step 906 may use the data to generate and render virtual manipulatives on a display screen corresponding to the physical manipulatives 725. Accordingly, the data transmitted in step 906 may include any and all data that allows a recipient to accurately render the landscape of physical manipulatives 725 on a digital display screen. Data such as the sizes, shapes, colors, patterns, textures, weights, orientations, and configurations of each individual physical manipulative 725 may be transmitted, along with current position data, previous position data, and movement data. Additionally, data identifying the previous and current connections and relationships between physical manipulatives 725 may be transmitted, such as stacks, groupings, or attachments or connections of two or more manipulatives 725.

As discussed above, in some embodiments, the physical manipulatives 725 may be a predetermined set of objects, and device 600 may be preprogrammed to recognize the predetermined objects by size, shape, and color, or by digital techniques such as RFID tags, weight sensors, etc. In such cases, because physical characteristics of the manipulatives 725 are known in advance, the device 600 might not collect or transmit certain data such as the sizes, shapes, colors, etc. Instead, it may be sufficient for the device 600 to transmit an object type and/or unique identifier corresponding to a physical manipulative 725, from which the recipient can retrieve the characteristics of the physical manipulative 725 from a data store and render a precise image. Additionally, the device 600 and/or user devices 730 may determine and transmit a value associated with the physical manipulative 725, based on the physical manipulative 725 itself as well as based on the current context of the CDN system.

Additionally, in some embodiments, the device 600 might not transmit data relating to every physical manipulative 725 currently in the environment, but instead only the physical manipulatives 725 that have been introduced to the environment, removed from the environment, or moved within the environment since the last transmission. For instance, in FIG. 7, in response to the movement of the two physical diagonal-patterned physical manipulatives 725 from quadrant A to quadrant B, the data captured in steps 901-905 and transmitted in step 906 might not include any data describing any other of the physical manipulatives 725 on the mat 720. Furthermore, as discussed above in reference to step 904, smaller amounts of summary data may be collected and transmitted in some embodiments, rather than complete sets of raw data describing the position, orientation, and configuration of physical manipulatives 725. For instance, a transmission in step 906 might only indicate a new physical quadrant or region, a new up-down or upward-facing-side orientation, and/or a new grouping, stacking, or connection with other physical manipulatives 725, rather than precision position and orientation data. Similarly, in some embodiments, the transmission in step 906 might not occur unless the updated positions of the physical manipulatives 725 determined in step 903, and/or the updated connections or relationships determined in step 905 satisfy a minimum threshold. For example, an accidental bump and other minor movement of a physical manipulative 725 that does not result in a significant change to the position or region, orientation, or relationships/connections of the physical manipulative 725 might not result in transmission from the device 600.

Figure 10:
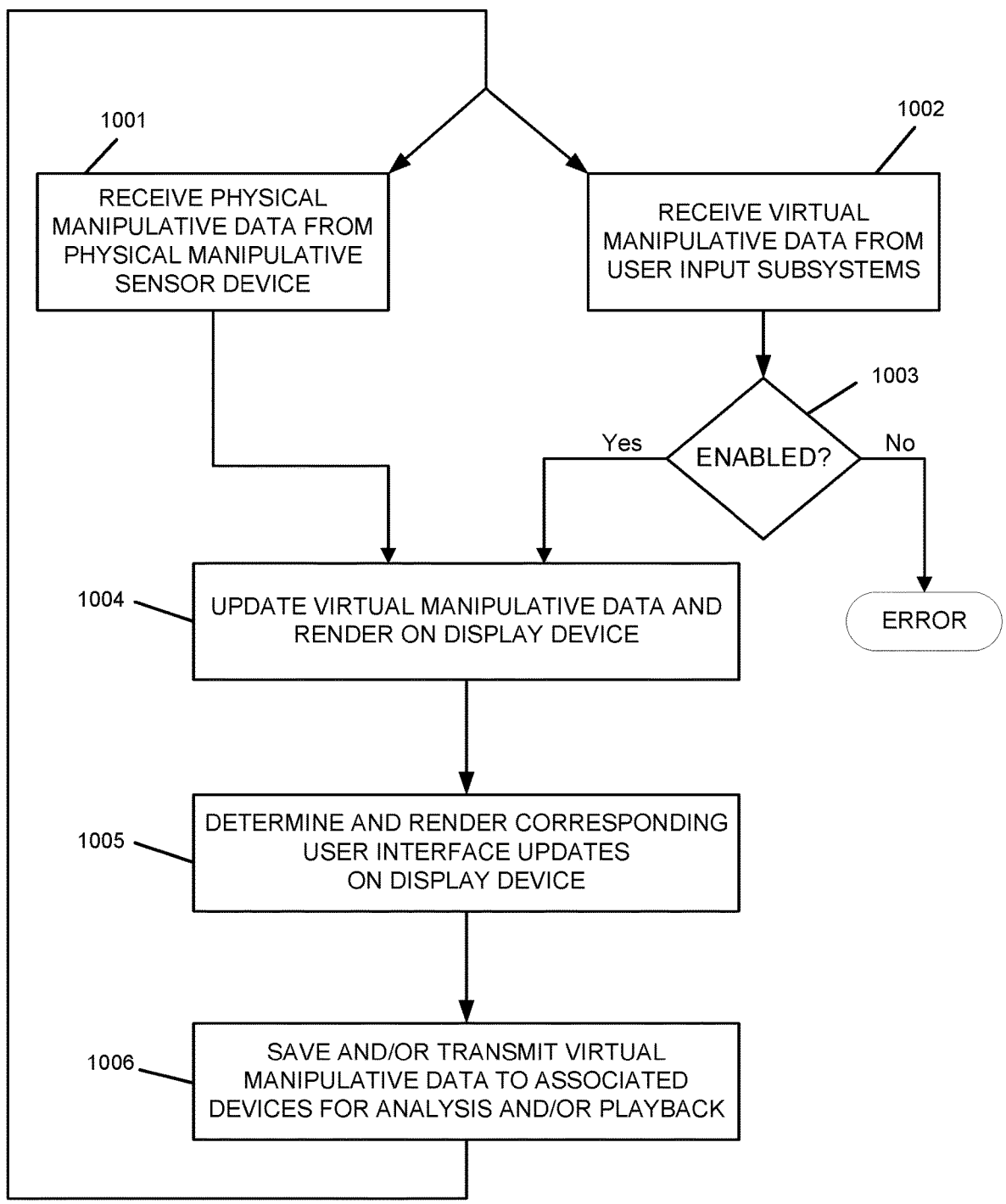
FIG. 10 is a flow diagram illustrating an example process of monitoring and processing data relating to augmented physical and virtual manipulatives via a physical manipulative sensor device and one or more display devices, according to one or more embodiments of the disclosure.

Referring now to FIG. 10, another flow diagram is shown illustrating a process of monitoring and processing data relating to augmented physical and virtual manipulatives. As described below, the steps in this process may be performed by one or more computing devices, such as user devices 106 (e.g., 730 or 830) and/or supervisor devices 110 (e.g., 760 or 860) within systems and CDNs such as 700 and 800 described above. However, it should be understood that the processes of monitoring and manipulating virtual manipulatives based on corresponding physical manipulatives need not be limited to the specific systems and hardware implementations described above in FIGS. 1-8, but may be performed within other computing environments comprising other combinations of the hardware and software components described herein.

In various embodiments, one or more user devices 106 (e.g., 730 or 830), supervisor device 110 (e.g., 760 or 860), and/or other servers or devices in a CDN such as 100, 700, or 800 may generate and render virtual manipulatives based on a corresponding set of physical manipulatives 725. As described above in reference to FIG. 9, physical manipulative sensing devices 600 and/or user devices 103 may be configured to detect, track, stored, and transmit data relating to sets of physical manipulatives (e.g., 725 or 825). Such data may be transmitted to user devices 103, supervisor devices 110, and/or other computer servers and devices so that corresponding virtual manipulatives may be generated and rendered on one or more digital display screens. Virtual manipulatives may be interactive digital representations of physical manipulatives. Generation and rendering virtual manipulatives on a display screen may thus involve receiving and analyzing data relating to a set of physical manipulatives 725, such as sizes, shapes, colors, patterns, textures, weights, etc., as well as receiving (or determining) position data, movement data, orientation data, and/or relationship/connection data for the physical manipulatives 725. Such data, described above in reference to FIGS. 6-9, may be detected, stored, and transmitted by one or more sensing devices 600 and/or user devices 103, and received by additional user devices 103 and/or supervisor devices 110 which may use the data to design, generate, and render corresponding digital objects which may be viewed and manipulated within the virtual environment of the computing devices. In some cases, each virtual manipulative may be generated and rendered with a one-to-one correspondence to a matching physical manipulative, and the virtual manipulative may be controlled via the computer user interface in the same manner that the physical manipulative 725 may be controlled by a user on the physical mat 720. For instance, a computer user interface for virtual manipulatives may allow a user to reposition, reorient, or reconfigure individual virtual manipulatives, and also define and change connections/relationships between groups of virtual manipulatives within the virtual environment. Additionally, in some embodiments, computer user interfaces for virtual manipulatives may support additional types of manipulations that may be impossible for the physical manipulatives 725, such as resizing, changing structure, changing color, copying and replicating additional objects, and the like.

Figure 11:
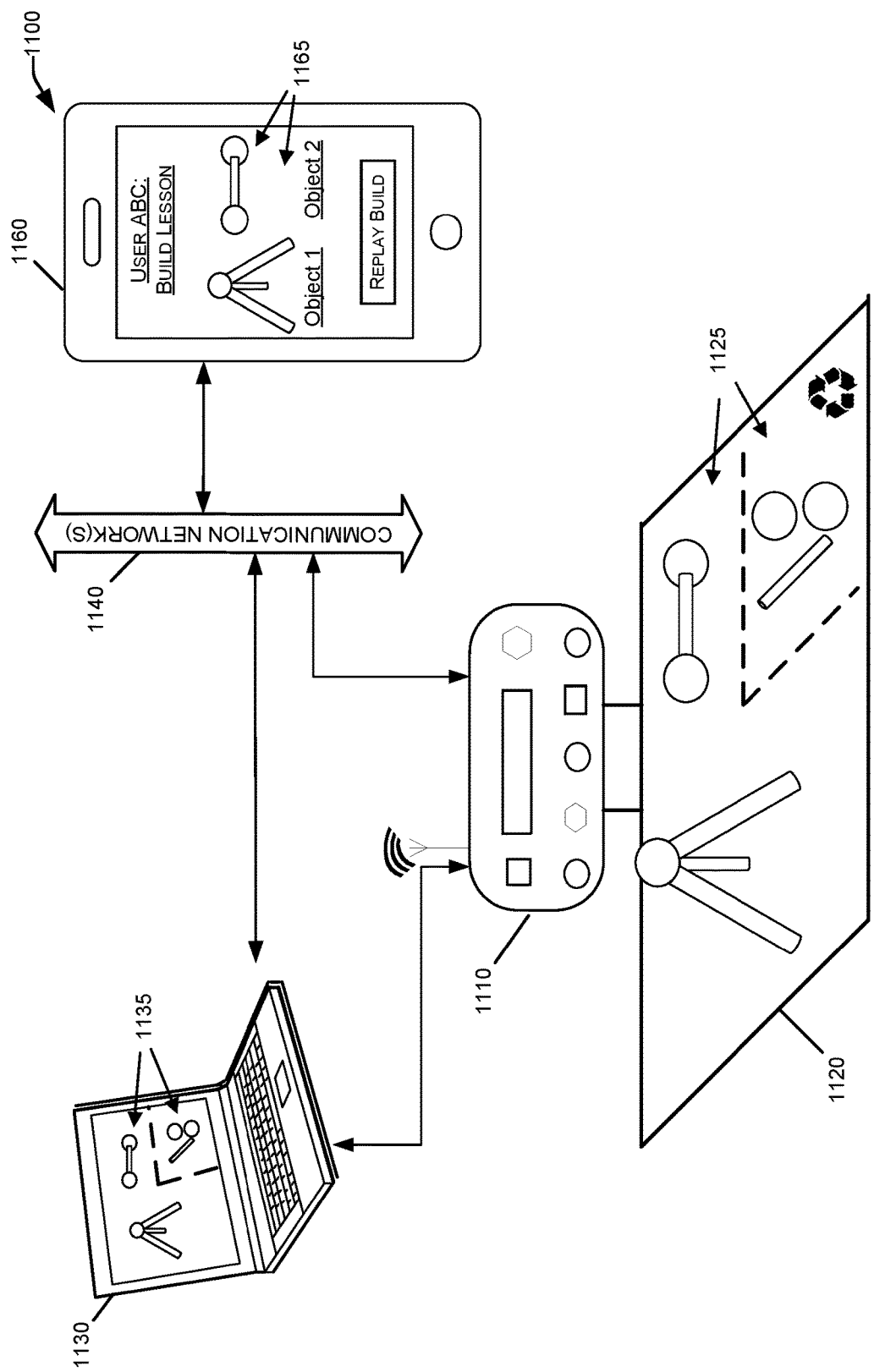
FIGS. 11 and 12 are block diagrams illustrating additional examples of one or more systems for interacting with augmented physical and virtual manipulatives, according to one or more embodiments of the disclosure.

Referring briefly to FIG. 11, another block diagram is shown illustrating an example system 1100 including a physical manipulative sensing device 1110, a user device 1130, and a supervisor device 1160 connected via a communication network 1140. Device 1110 may be similar or identical to physical manipulative sensing devices 600 discussed above. User device 1130 and supervisor device 1160 each may include some or all of the hardware, software, and networking components discussed above in connection with user devices 106 and/or supervisor devices 110. Communication network 1140 may correspond to any network or combination of networks discussed above in reference to communication network 220, including TCP/IP packet-based computer networks, telecommunication networks, wireless networks, etc.

System 1100 may include similar components to those described above in systems 700 and 800, including a sensing device 1100 positioned to detect and record data relating to physical manipulatives 1125 on a physical mat environment 1120. In this example, the device 1100 may transmit data describing the physical manipulatives 1125 to the user laptop device 1130 which may generate and render a corresponding set of virtual manipulatives 1135 on the display screen of the laptop 1130. Additionally, the sensing device 1100 and/or the laptop 1130 may transmit data describing the physical and/or virtual manipulatives to the supervisor device 1160, which may generate and render a different corresponding set of virtual manipulatives 1165 on the display screen of the supervisor device 1160.

As shown in this example, different devices 1130 and 1160 may generate different sets of virtual manipulatives 1135 and 1165 based on the same set of physical manipulatives 1125. For example, user device 1130 may provide a manipulation user interface which allows users to alter the individual virtual manipulatives 1135. For instance, users of the user device 1130 may add or remove virtual manipulatives 1135 from the virtual workspace, change the positions, orientations, or configurations of individual virtual manipulatives 1135, and/or define or change the relationships and connections between virtual manipulatives 1135. In contrast, the supervisor device 1160 may provide a different user interface for virtual manipulatives 1165, which may only allow supervisor users to view current layout of physical manipulatives 1125 and previous layouts from an initial starting time. For instance, supervisor users at device 1160 may click the "Replay Build" button to view a virtual reenactment of the step-by-step real-time introductions, removals, movements, and re-orientations of the physical manipulatives 1125 up to the current time. In some embodiments, the supervisor users at device 1160 also may receive audio corresponding to a narrative recorded by a user while moving and positioning the physical manipulatives 1125.

Referring again to FIG. 10, in step 1001, a device (e.g., 1130 or 1160) displaying a set of virtual manipulatives (e.g., 1135 or 1165) may receive data relating to a corresponding set of physical manipulatives 1125 from a physical manipulative sensing device 1110. The receipt of data in step 1001 may indicate the one or more of the physical manipulatives 1125 has been moved, reoriented, reconfigured, etc., within the physical mat environment 1120. The data received in step 1001 may correspond to the data transmitted in step 906, discussed above. For example, the received data may include data such as sizes, shapes, colors, patterns, textures, weights, orientations, and configurations of each individual physical manipulative 1125, along with current position data, previous position data, and movement data. Additionally, data identifying the previous and current connections and relationships between physical manipulatives 1125 may be received, such as stacks, groupings, or attachments or connections of two or more manipulatives 1125. Additionally, the received data may include identifiers of the specific physical manipulatives and/or values associated with each physical manipulative 1125. As described above, such values may be determined based on the physical manipulative 1125 itself as well as based on the current context of the CDN system 1100.

In step 1002, the same or a related device (e.g., 1130) displaying the set of virtual manipulatives (e.g., 1135) may receive user inputs relating to the virtual manipulatives 1135. Thus, the receipt of data in step 1002 may indicate the user has manipulated one or more virtual manipulatives 1135, using the virtual manipulation user interface of a user device 1130. The physical manipulatives 1125 need not have changed at all in this case. Instead, step 1002 may indicate that a user has manipulated only the virtual manipulatives 1135 within the computing environment 1130, for example, by adding or removing virtual manipulatives 1135 to the virtual environment, reorienting or reconfiguring virtual manipulatives 1135, and/or defining or changing relationships/connection between virtual manipulatives 1135 by grouping or ungrouping, stacking or unstacking, or connecting or disconnecting groups of two or more virtual manipulatives 1135.

The data received in step 1002 may be similar or identical to the data received in step 1001. In some embodiments, the virtual manipulatives 1135 may be moved, oriented, and connected, etc., in exactly the same ways that the corresponding physical manipulatives 1125 moved, oriented, and connected, etc. Additionally, in some cases, the user-initiated manipulations to the virtual manipulatives 1135 may include manipulations that could not be performed on the physical manipulatives 1125. For example, virtual manipulations performed via user devices 1130 or supervisor devices 1160 need not be constrained by the physical mat environment 1120, the numbers or characteristics of the physical manipulatives 1125, or even by the laws of physics. Thus, in some cases, the data received in step 1002 describing virtual manipulations performed on virtual manipulatives 1135 may include additional data incompatible with the current layout of the physical manipulatives 1125. Additionally, the received data in step 1002 also may include identifiers of the specific virtual manipulatives 1135 (corresponding to specific physical manipulatives 1125) and/or values associated with each virtual manipulative 1135. As described above, such values may be determined based on the virtual manipulative 1135 itself as well as based on the current context of the CDN system 1100.

As shown in step 1003, user manipulation of virtual manipulatives 1135 may be enabled or disabled in various embodiments and/or situations. In some cases, a computer user interface might enable user manipulation of virtual manipulatives 1135 only after the set of physical manipulatives 1125 has been positioned by the user and evaluated by the software of the sensing device 1110, user device 1130, or supervisor device 1160, etc. Additionally, the capabilities of users to manipulate virtual manipulatives 1135 via the user device 1130 may be enabled or disabled remotely in some embodiments, for example, by an administrative configuration on a CDN server 750, or by a supervisor user on a supervisor device 1160. These enabling and disabling capabilities may be advantageous in certain embodiments, such as gaming CDNs 1100, eLearning CDNs 1100, interactive-media CDNs 1100, etc.

In step 1004, in response to the manipulation of the physical manipulatives 1125 in the physical environment (e.g., physical mat 1120), or the manipulation of the virtual manipulatives 1135 in the virtual environment (e.g., user device 1130), the virtual manipulatives 1135 displayed in the virtual environment may be updated to reflect the changes. For example, one or more computing device(s) controlling virtual environments, such as user device 1130 and supervisor device 1160, may reposition, reorient, or reconfigure individual virtual manipulatives 1135 and 1165, and also may change connections/relationships between groups of virtual manipulatives 1135 and 1165, in response to the changes to the physical manipulatives 1125 received in step 1001 and/or changes to the physical manipulatives 1135 received in step 1002.

In step 1005, one or more addition user interface updates may be determined and performed in response to the updates of the virtual manipulatives 1135 in step 1004. For example, the user device 1130 and/or supervisor device 1160 in various embodiments may be configured to display interactive content in addition to rendering the virtual manipulatives 1135. Such interactive content may be used, for example, to instruct or evaluate the user when manipulating the physical manipulatives 1125 and/or virtual manipulatives 1135. For instance, various user interface components may display computed sums, scores, feedback or evaluation results, or may indicate a computer-generated move for a virtual manipulative 1135 in response to a previous user move of a physical or virtual manipulative (e.g., for one-player games, eLearning assignments, etc.).

Figure 12:
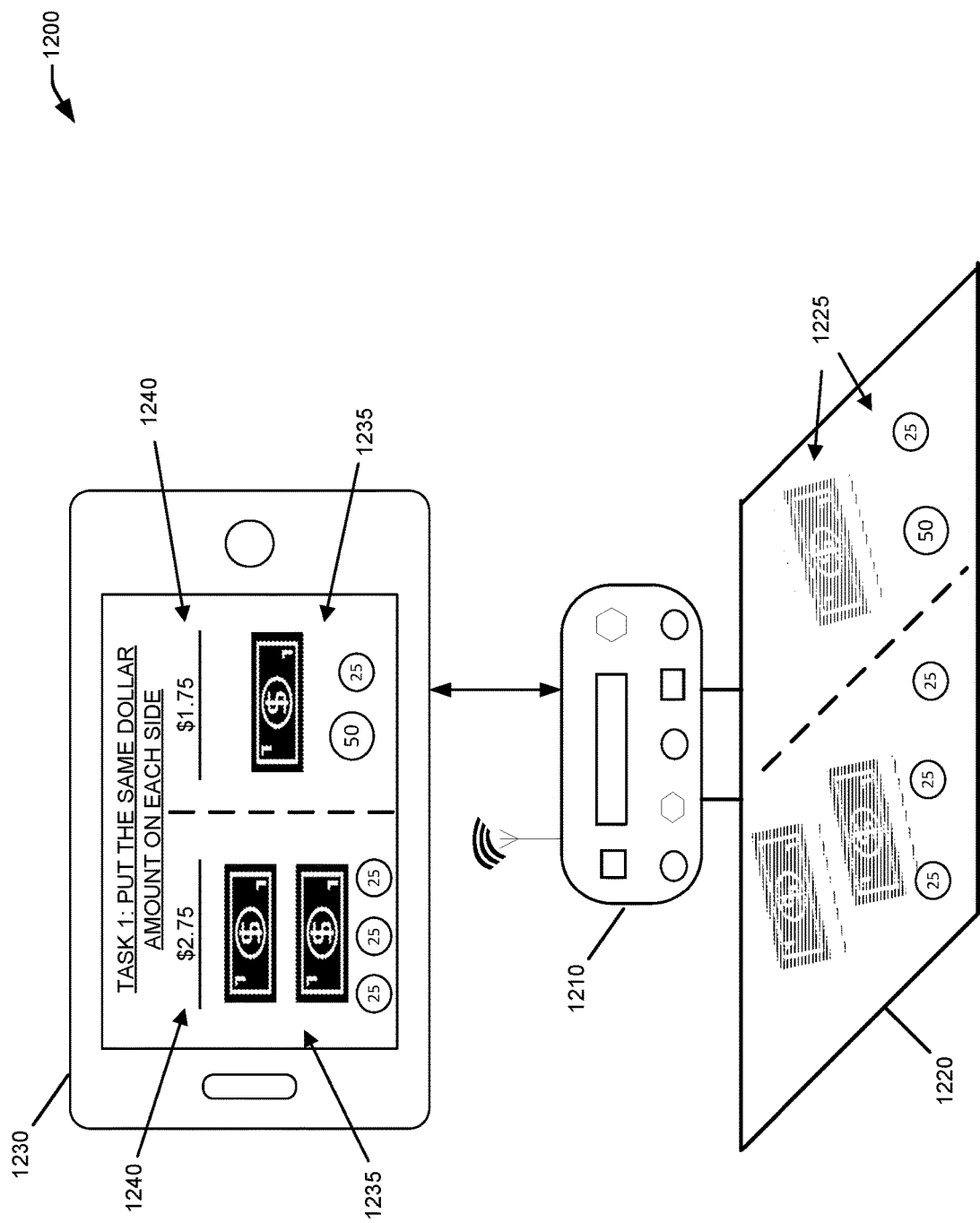

Referring briefly to FIG. 12, another example system 1200 is shown including a physical manipulative sensing device 1210 and a user device 1230. Device 1210 may be similar or identical to physical manipulative sensing devices 600 discussed above, and user device 1230 may correspond to a user device 106 (e.g., 1130) or supervisor device 110 (e.g., 1160) as discussed. In this system 1200, a user may position and manipulate a set of paper money and coin physical manipulatives 1225 on a physical mat environment 1220. Sensing device 1210 may detect and track each physical manipulative 1225, and transmit the data to device 1230 so that corresponding virtual manipulative 1235 may be generated and rendered on the display screen. As described above, device 1230 (e.g., a user device and/or supervisor device) may allow the paper money and coin virtual manipulatives 1235 to be repositioned, reconfigured, grouped, stacked, etc., separately from physical manipulatives 1225. Device 1230 also may provide additional user interface components to instruct or evaluate the user when manipulating the physical or virtual manipulatives. In this example, device 1230 provides a user interface instructing the user to put the same amount of money in both regions of the physical or virtual environment, and includes real-time evaluation components 1240 to sum the dollar amounts on each side of the physical or virtual environment. Such instructional or evaluation components 1240 may perform simple mathematical tasks as in this example, or more provide more complex and strategic tasks in other examples (e.g., evaluating an augment physical/virtual construction or project, providing suggestions for subsequent user manipulations, providing the computer moves in a one-player strategy game, etc.).

In step 1006, data describing the sequence of physical and/or virtual manipulations in the augmented physical and virtual manipulative system may be transmitted and/or stored for future analysis and/or playback. For example, referring again to FIG. 11, the sensing device 1110 and/or user device 1130 may store and transmit a series of user-initiated manipulations of the physical and virtual manipulatives to the supervisor device 1160. As shown in this example, the supervisor device 1160 may be provided a user interface option "Replay Build" to replay the sequence of user-initiated manipulations of both the physical manipulatives 1125 and the corresponding virtual manipulatives 1135. In this example, the sensing device 1110 and/or user device 1130 may detect the beginning of a multi-step user manipulation of a set of physical manipulatives within the physical environment, and in response may activate certain additional sensors (e.g., video cameras and the audio recording system) in order to track to user's speed of performing the various steps, the order of steps performed, the initial appearance of errors and/or any backtracking by the user, as well as the user's comments and other user behaviors during the multi-step manipulation process. After detecting (or receiving input indicating) the end of the multi-step user process, the additional sensors may be deactivated and an audio-video playback file of the multi-step user manipulation process may be generated. Such replay and analysis may be performed in real-time or subsequently using previously stored data. Analyses of user interactions with the physical and virtual manipulatives in the system may include scoring and evaluating user design solutions, decisions, and/or speed when interacting with various interactive gaming CDNs, eLearning CDNs, interaction media CDNs, etc.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system, comprising:
a physical manipulative sensor device including:
a hardware-based sensor configured to detect physical manipulatives within a physical environment, and
a processing unit comprising one or more processors, wherein the processing unit is configured to:
detect a position of, a movement of, or a user interaction with, a first physical manipulative within the physical environment, and
transmit, to a user computing device, data identifying the position of, the movement of, or the user interaction with the first physical manipulative; and
a user computing device including:
a graphical display screen configured to render a set of virtual manipulatives in a virtual environment; and
a processing unit configured to:
output, to the graphical display screen, a rendering of a first virtual manipulative corresponding to the first physical manipulative within the physical environment,
receive the data identifying the position of, the movement of, or the user interaction with the first physical manipulative, and
update, via the graphical display screen, the rendering of the first virtual manipulative based on the received data corresponding to the first physical manipulative; and
wherein the processing unit of the physical manipulative sensor device is configured to:
detect a beginning of a multi-step user manipulation of the first physical manipulative by a user,
activate a video camera in response to the detection of the beginning of the multi-step user manipulation to capture an image of the user performing the multi-step user manipulation of the first physical manipulative,
detect an ending of the multi-step user manipulation of the first physical manipulative within the physical environment,
generate a video file based upon data received from the video camera, and
transmit the video file to the user computing device.

2. The system of claim 1, wherein the hardware-based sensor includes:
a camera positioned at a predetermined location with respect to the physical environment;
a depth sensor comprising an infrared laser mounted at a predetermined location with respect to the physical environment; and
an audio recording system.

3. The system of claim 2, wherein the detection of the position of, the movement of, or the user interaction with, the first physical manipulative includes a determination that the first physical manipulative is stacked on a second physical manipulative within the physical environment.

4. The system of claim 1, wherein the user computing device further comprises a hardware-based user input subsystem configured to receive user-initiated manipulations of the set of virtual manipulatives in the virtual environment, and wherein the processing unit of the user computing device is configured to:
receive user input data via the user input subsystem; and
update, via the graphical display screen, the rendering of the virtual manipulatives based on the received user input data.

5. The system of claim 1, wherein the hardware-based sensor includes a radio-frequency identification reader configured to receive data from a radio-frequency identification tab coupled to the first physical manipulative.

6. The system of claim 5, wherein the hardware-based sensor includes a camera configured to track a location of the first physical manipulative within the physical environment.

7. The system of claim 1, further comprising a second physical manipulative sensor device comprising, wherein the second physical manipulative sensor device is positioned at a separate location from the physical manipulative sensor device, and wherein the second physical manipulative sensor device is configured to detect the physical manipulatives within the physical environment from the separate location.

8. The system of claim 7, wherein the second physical manipulative sensor device is further configured to:
determine one or more updated physical positions, updated physical orientations, updated physical configurations, or updated physical relationships of the first physical manipulative within the physical environment; and
transmit, to the physical manipulative sensor device, data identifying the one or more determined updated physical positions, updated physical orientations, updated physical configurations, or updated physical relationships of the first physical manipulative, wherein the second physical manipulative sensor device is configured not to transmit the data to the computing device.

* * * * *